United States Patent [19]

Hiratsuka et al.

[11] Patent Number: 4,803,558
[45] Date of Patent: Feb. 7, 1989

[54] HALFTONE IMAGE ESTIMATION METHODS FOR DITHER IMAGES

[75] Inventors: Seiichiro Hiratsuka; Masahiko Matsunawa; Yoshinori Abe, all of Hachioji, Japan

[73] Assignee: Konishiroku Photo Industry Co., Ltd., Tokyo, Japan

[21] Appl. No.: 929,622

[22] Filed: Nov. 10, 1986

[30] Foreign Application Priority Data

Nov. 15, 1985 [JP] Japan .................................. 60-257489
Nov. 15, 1985 [JP] Japan .................................. 60-257495

[51] Int. Cl.$^4$ .............................................. H04N 1/40
[52] U.S. Cl. ........................................ 358/283; 382/56
[58] Field of Search ...................... 358/280, 282, 283; 382/56

[56] References Cited

U.S. PATENT DOCUMENTS 4,349,846 9/1982 Sekigawa ............................ 358/283

Primary Examiner—Edward L. Coles, Sr.
Attorney, Agent, or Firm—Frishauf, Holtz, Goodman & Woodward

[57] ABSTRACT

The present invention relates to a method of estimating a halftone image in which a plurality of scanning unit areas including, at least, a unit area of (1 pixel × 1 pixel) are set in a binary image consisting of white and black regions; a binary image obtained from estimated values based on a ratio between white and black regions within the scanning unit area; an estimated value of an optimum scanning unit area is obtained per every pixel of the halftone image is produced based on the estimated value; and further the estimated halftone image is reconverted to a binary image after processing of enlarging or reducing.

16 Claims, 25 Drawing Sheets

FIG. 2
2-a
| 2 | 3 | 5 | 4 | 2 | 1 | 1 | 3 | 3 | 3 |
|---|---|---|---|---|---|---|---|---|---|
| 3 | 4 | 6 | 6 | 5 | 3 | 1 | 1 | 2 | 1 |
| 5 | 9 | 15| 8 | 6 | 2 | 1 | 1 | 1 | 2 |
| 9 | 12| 16| 14| 10| 8 | 5 | 3 | 1 | 1 |
| 12| 10| 12| 8 | 6 | 6 | 3 | 2 | 1 | 1 |
| 16| 14| 13| 7 | 5 | 3 | 2 | 1 | 1 | 1 |
| 12| 0 | 8 | 6 | 4 | 1 | 1 | 1 | 2 | 1 |
| 8 | 6 | 3 | 2 | 1 | 1 | 2 | 2 | 2 | 1 |
| 4 | 5 | 3 | 1 | 1 | 2 | 2 | 3 | 2 | 1 |
| 3 | 4 | 2 | 1 | 1 | 1 | 2 | 3 | 4 | 3 |
ORIGINAL HALFTONE IMAGE
2-c
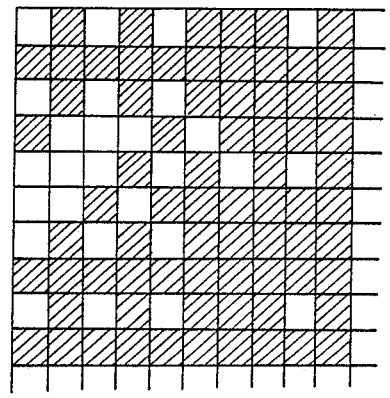
DITHER IMAGE
2-b
| 0 | 8 | 2 | 10|
|---|---|---|---|
| 12| 4 | 14| 6 |
| 3 | 11| 1 | 9 |
| 15| 7 | 13| 5 |
THRESHOLD MATRIX
FIG. 3
(Z)   (A)   (B) 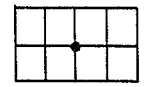
(C)   (D) 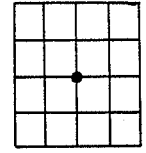

| 0 | 0 | 0 | 0 | 0 | 0 | 0 |
|---|---|---|---|---|---|---|
| 0 | 16 | 0 | 16 | 0 | 0 | 0 |
| 16 | 16 | 16 | 0 | 16 | 0 | 0 |
| 16 | 16 | 0 | 16 | 0 | 16 | 0 |
| 16 | 0 | 16 | 0 | 0 | 0 | 0 |
| 0 | 16 | 0 | 16 | 0 | 0 | 0 |
| 0 | 0 | 0 | 0 | 0 | 0 | 0 |

UNIT AREA
Z

4-b

| 4 | 4 | 4 | 4 | 0 | 0 | 0 |
|---|---|---|---|---|---|---|
| 12 | 12 | 8 | 8 | 4 | 0 | 0 |
| 16 | 12 | 8 | 8 | 8 | 4 | 4 |
| 12 | 8 | 8 | 4 | 4 | 4 | 4 |
| 8 | 8 | 8 | 4 | 0 | 0 | 0 |
| 4 | 4 | 4 | 4 | 0 | 0 | 0 |
| 4 | 4 | 4 | 4 | 0 | 0 | 4 |

UNIT AREA
A

4-c

| 4 | 4 | 4 | 2 | 2 | 0 | 0 |
|---|---|---|---|---|---|---|
| 10 | 10 | 10 | 6 | 4 | 2 | 0 |
| 12 | 12 | 10 | 8 | 6 | 6 | 4 |
| 12 | 10 | 6 | 6 | 4 | 4 | 4 |
| 10 | 8 | 6 | 4 | 2 | 0 | 0 |
| 4 | 4 | 4 | 2 | 2 | 0 | 0 |
| 4 | 4 | 4 | 2 | 2 | 2 | 2 |

UNIT AREA
B

4-d

| 8 | 8 | 6 | 6 | 2 | 0 | 2 |
|---|---|---|---|---|---|---|
| 10 | 8 | 6 | 6 | 4 | 2 | 2 |
| 12 | 10 | 8 | 6 | 4 | 2 | 2 |
| 12 | 10 | 8 | 6 | 4 | 2 | 2 |
| 8 | 6 | 6 | 4 | 2 | 2 | 2 |
| 6 | 6 | 6 | 4 | 0 | 0 | 2 |
| 4 | 4 | 4 | 4 | 0 | 0 | 2 |

UNIT AREA
C

4-e

| 7 | 7 | 7 | 4 | 3 | 2 | 1 |
|---|---|---|---|---|---|---|
| 8 | 8 | 7 | 5 | 4 | 3 | 2 |
| 11 | 10 | 8 | 6 | 4 | 3 | 2 |
| 11 | 10 | 8 | 6 | 4 | 3 | 2 |
| 8 | 7 | 5 | 4 | 3 | 2 | 2 |
| 7 | 6 | 5 | 3 | 2 | 1 | 1 |
| 4 | 4 | 4 | 2 | 2 | 1 | 1 |

UNIT AREA
D

FIG. 5
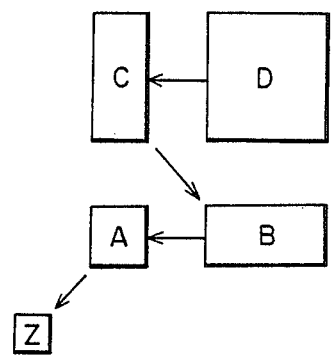
FIG. 6        FIG. 7
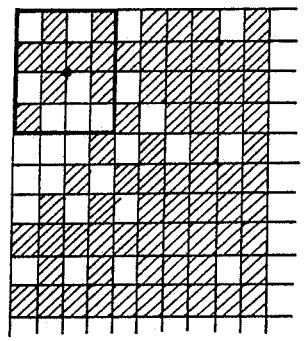 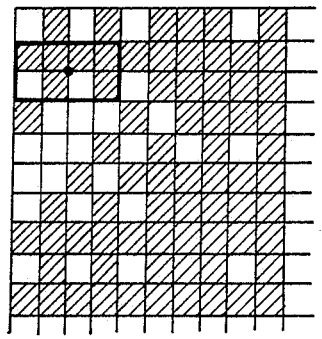

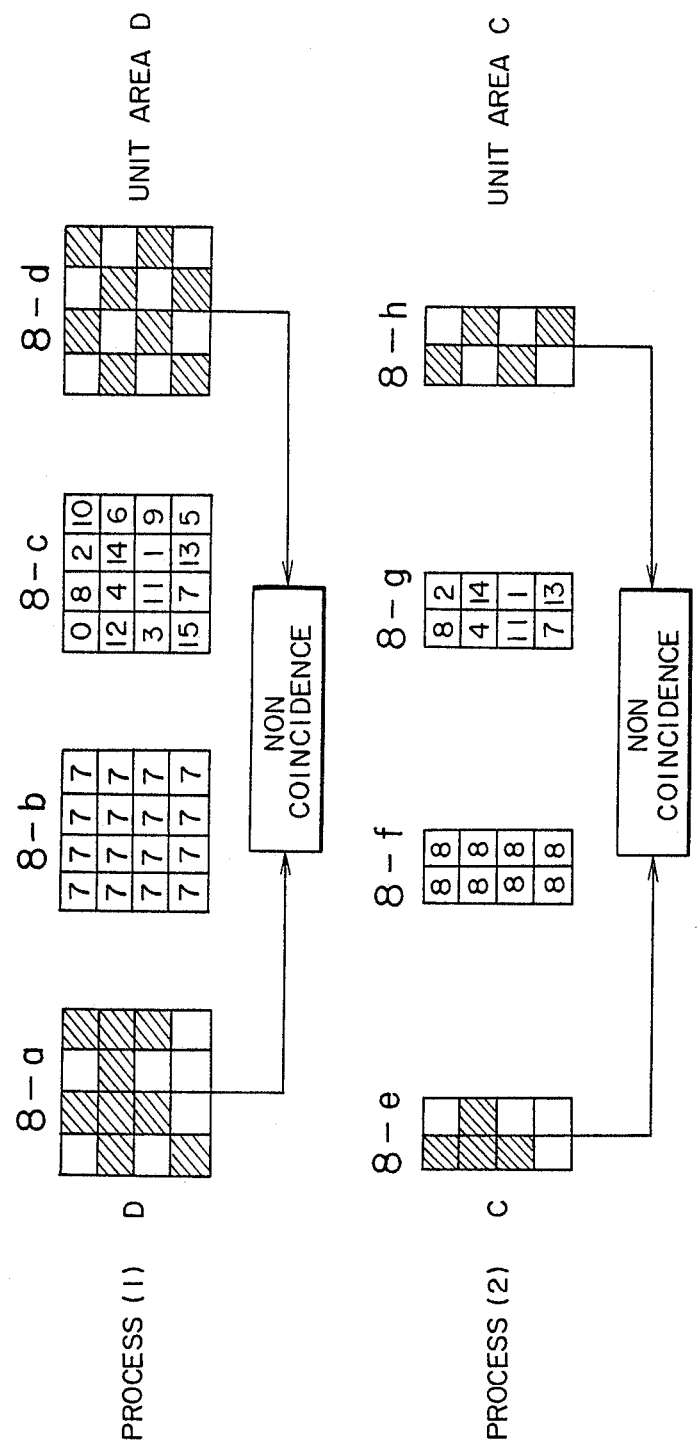

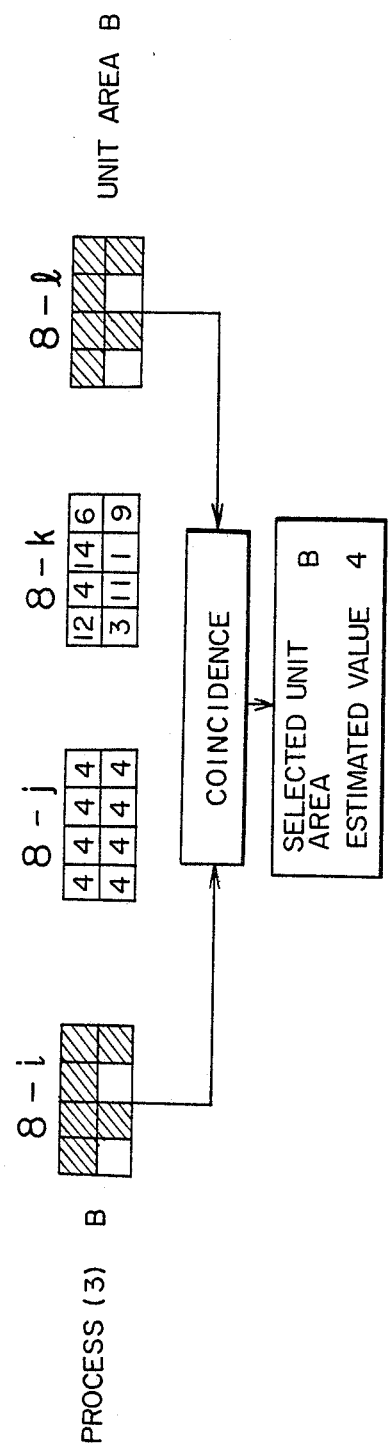

FIG. 12
12-a
| 4 | 4 | 4 | 4 | 4 | 0 | 0 | 1 | 1 |
|---|---|---|---|---|---|---|---|---|
| 0 | 16| 6 | 6 | 8 | 0 | 0 | 0 | 0 |
| 16| 16| 8 | 8 | 8 | 8 | 4 | 4 | 4 |
| 16| 16| 8 | 8 | 8 | 8 | 4 | 4 | 4 |
| 12| 10| 8 | 8 | 4 | 4 | 4 | 4 | 4 |
| 8 | 8 | 8 | 8 | 4 | 0 | 0 | 0 | 0 |
| 4 | 4 | 4 | 4 | 4 | 0 | 1 | 1 | 1 |
| 4 | 4 | 4 | 4 | 2 | 2 | 1 | 1 | 1 |
| 4 | 4 | 4 | 4 | 2 | 2 | 1 | 1 | 1 |
ENLARGED HALFTONE IMAGE
12-b
| 4 | 4 | 4 | 0 | 0 |
|---|---|---|---|---|
| 0 | 16| 8 | 0 | 0 |
| 12| 10| 4 | 4 | 4 |
| 8 | 8 | 4 | 0 | 0 |
| 4 | 4 | 4 | 0 | 1 |
REDUCED HALFTONE IMAGE
12-c
| 0 | 8 | 2 | 10|
|---|---|---|---|
| 12| 4 | 14| 6 |
| 3 | 11| 1 | 9 |
| 15| 7 | 13| 5 |
DITHER MATRIX
12-d
| 0 | 8 | 2 | 10|
|---|---|---|---|
| 12| 4 | 14| 6 |
| 3 | 11| 1 | 9 |
| 15| 7 | 13| 5 |
DITHER MATRIX
12-e
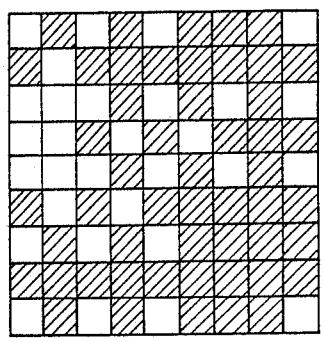
ENLARGED DITHER IMAGE
12-f
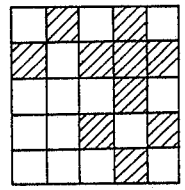
REDUCED DITHER IMAGE

FIG. 14

14-b THRESHOLD MATRIX

| 0 | 32 | 8 | 40 | 2 | 34 | 10 | 42 |
|---|---|---|---|---|---|---|---|
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |

14-a ORIGINAL HALFTONE IMAGE

| 5 | 5 | 5 | 4 | 5 | 5 | 4 | 4 | 5 | 5 | 5 | 5 | 6 | 7 | 5 |
|---|---|---|---|---|---|---|---|---|---|---|---|---|---|---|
| 6 | 6 | 6 | 5 | 5 | 5 | 5 | 5 | 5 | 5 | 8 | 10 | 11 | 12 | 10 |
| 8 | 6 | 8 | 5 | 5 | 5 | 6 | 6 | 7 | 8 | 11 | 12 | 11 | 12 | 16 |
| 13 | 9 | 7 | 5 | 7 | 8 | 9 | 10 | 11 | 13 | 12 | 11 | 11 | 16 | 22 |
| 19 | 18 | 16 | 9 | 8 | 10 | 9 | 11 | 11 | 10 | 10 | 12 | 16 | 22 | 25 |
| 27 | 28 | 25 | 26 | 24 | 26 | 28 | 28 | 18 | 17 | 20 | 25 | 22 | 31 | 32 |
| 32 | 30 | 32 | 38 | 40 | 44 | 40 | 43 | 42 | 38 | 37 | 35 | 30 | 37 | 35 |
| 37 | 35 | 39 | 41 | 47 | 48 | 43 | 48 | 55 | 55 | 52 | 44 | 37 | 42 | 42 |
| 33 | 33 | 37 | 41 | 49 | 58 | 49 | 49 | 53 | 54 | 53 | 51 | 48 | 44 | 50 |
| 33 | 32 | 32 | 37 | 43 | 47 | 50 | 44 | 52 | 52 | 50 | 48 | 47 | 42 | 52 |
| 35 | 33 | 32 | 38 | 43 | 41 | 44 | 44 | 45 | 46 | 48 | 46 | 45 | 50 | 50 |
| 36 | 32 | 32 | 34 | 38 | 40 | 41 | 41 | 43 | 45 | 46 | 45 | 48 | 49 | 49 |
| 31 | 33 | 30 | 36 | 40 | 42 | 40 | 41 | 45 | 45 | 43 | 43 | 47 | 48 | 50 |
| 32 | 30 | 31 | 34 | 36 | 40 | 41 | 40 | 40 | 42 | 41 | 42 | 46 | 48 | 48 |
| 32 | 29 | 32 | 36 | 37 | 39 | 40 | 38 | 38 | 40 | 40 | 41 | 45 | 46 | 46 |
| 30 | 31 | 31 | 35 | 37 | 37 | 38 | 38 | 37 | 39 | 40 | 42 | 43 | 42 | 43 |
| 32 | 30 | 32 | 34 | 36 | 36 | 37 | 37 | 36 | 39 | 40 | 42 | 42 | 42 | 42 |
| 30 | 29 | 31 | 33 | 35 | 37 | 38 | 39 | 39 | 40 | 40 | 41 | 42 | 42 | 42 |

14-c
DITHER IMAGE

FIG. 16

16-a
UNIT AREA A

| 16 | 16 | 16 | 16 | 16 | 16 | 0  | 0  | 16 |
|----|----|----|----|----|----|----|----|----|
| 16 | 16 | 16 | 32 | 32 | 32 | 16 | 0  | 16 |
| 16 | 16 | 16 | 48 | 48 | 32 | 32 | 32 | 32 |
| 32 | 32 | 48 | 64 | 48 | 32 | 32 | 48 | 48 |
| 48 | 48 | 64 | 64 | 48 | 48 | 48 | 48 | 48 |
| 64 | 64 | 48 | 48 | 64 | 64 | 48 | 48 | 48 |
| 64 | 64 | 48 | 48 | 64 | 48 | 32 | 48 | 48 |
| 48 | 48 | 48 | 48 | 48 | 32 | 32 | 48 | 48 |
| 48 | 48 | 48 | 32 | 32 | 48 | 48 | 32 | 32 |

16-b
UNIT AREA B

| 16 | 16 | 16 | 16 | 16 | 8  | 8  | 8  | 8  |
|----|----|----|----|----|----|----|----|----|
| 16 | 16 | 24 | 24 | 32 | 24 | 16 | 16 | 16 |
| 16 | 16 | 32 | 32 | 40 | 40 | 32 | 32 | 32 |
| 32 | 40 | 48 | 48 | 48 | 40 | 40 | 40 | 40 |
| 48 | 56 | 56 | 56 | 56 | 48 | 48 | 48 | 48 |
| 56 | 56 | 56 | 56 | 56 | 56 | 56 | 48 | 48 |
| 56 | 56 | 56 | 56 | 48 | 48 | 48 | 40 | 40 |
| 48 | 48 | 48 | 48 | 40 | 40 | 40 | 40 | 40 |
| 48 | 48 | 40 | 40 | 40 | 40 | 40 | 40 | 32 |

UNIT AREA C

| 8  | 8  | 16 | 24 | 16 | 16 | 16 | 8  | 8  |
|----|----|----|----|----|----|----|----|----|
| 16 | 16 | 16 | 32 | 32 | 24 | 16 | 16 | 24 |
| 24 | 24 | 32 | 48 | 40 | 32 | 24 | 24 | 32 |
| 32 | 32 | 40 | 56 | 48 | 40 | 40 | 40 | 40 |
| 48 | 48 | 48 | 56 | 56 | 48 | 40 | 48 | 48 |
| 56 | 56 | 56 | 56 | 56 | 48 | 40 | 48 | 48 |
| 56 | 56 | 48 | 48 | 56 | 48 | 40 | 48 | 48 |
| 56 | 56 | 48 | 40 | 48 | 48 | 40 | 40 | 40 |
| 48 | 48 | 48 | 40 | 40 | 40 | 40 | 40 | 40 |

16-d

UNIT AREA D

| 12 | 12 | 16 | 16 | 20 | 16 | 12 | 12 | 12 |
|----|----|----|----|----|----|----|----|----|
| 16 | 16 | 24 | 24 | 28 | 24 | 20 | 20 | 20 |
| 24 | 28 | 39 | 36 | 40 | 32 | 28 | 28 | 28 |
| 32 | 36 | 44 | 44 | 48 | 44 | 40 | 40 | 40 |
| 44 | 48 | 52 | 52 | 52 | 48 | 48 | 44 | 44 |
| 52 | 56 | 56 | 56 | 52 | 48 | 48 | 44 | 44 |
| 52 | 52 | 52 | 52 | 48 | 48 | 48 | 44 | 44 |
| 52 | 52 | 48 | 48 | 44 | 44 | 44 | 40 | 36 |
| 48 | 48 | 44 | 44 | 40 | 40 | 40 | 40 | 36 |

FIG. 16

16-e
UNIT AREA E

| 18 | 16 | 16 | 14 | 14 | 14 | 16 | 14 | 14 |
|----|----|----|----|----|----|----|----|----|
| 22 | 22 | 22 | 20 | 22 | 22 | 24 | 24 | 22 |
| 32 | 32 | 32 | 30 | 32 | 32 | 34 | 32 | 30 |
| 40 | 40 | 40 | 40 | 42 | 42 | 44 | 42 | 38 |
| 48 | 48 | 48 | 48 | 50 | 48 | 48 | 46 | 42 |
| 54 | 54 | 52 | 52 | 52 | 50 | 48 | 46 | 42 |
| 52 | 52 | 50 | 50 | 50 | 48 | 46 | 46 | 42 |
| 50 | 50 | 48 | 48 | 46 | 44 | 40 | 40 | 38 |
| 46 | 46 | 44 | 44 | 42 | 42 | 38 | 38 | 36 |

16-f
UNIT AREA F

| 16 | 18 | 22 | 22 | 24 | 20 | 18 | 18 | 18 |
|----|----|----|----|----|----|----|----|----|
| 22 | 24 | 28 | 28 | 30 | 26 | 24 | 24 | 24 |
| 28 | 30 | 34 | 34 | 36 | 32 | 30 | 28 | 28 |
| 34 | 36 | 40 | 40 | 40 | 36 | 34 | 32 | 32 |
| 38 | 40 | 44 | 44 | 44 | 40 | 38 | 36 | 36 |
| 42 | 44 | 46 | 46 | 46 | 44 | 42 | 40 | 38 |
| 46 | 48 | 48 | 48 | 46 | 44 | 44 | 42 | 40 |
| 48 | 50 | 46 | 46 | 44 | 42 | 42 | 40 | 38 |
| 48 | 48 | 44 | 44 | 42 | 42 | 42 | 40 | 36 |

16-g
UNIT AREA G

| 21 | 20 | 20 | 19 | 20 | 20 | 21 | 19 | 19 |
|----|----|----|----|----|----|----|----|----|
| 27 | 26 | 26 | 25 | 26 | 26 | 27 | 25 | 23 |
| 33 | 32 | 32 | 31 | 32 | 31 | 32 | 30 | 28 |
| 38 | 38 | 37 | 36 | 37 | 36 | 36 | 35 | 32 |
| 42 | 42 | 41 | 40 | 41 | 40 | 40 | 39 | 36 |
| 45 | 45 | 44 | 44 | 44 | 43 | 42 | 41 | 38 |
| 47 | 47 | 46 | 46 | 46 | 45 | 43 | 42 | 39 |
| 47 | 47 | 46 | 46 | 44 | 43 | 41 | 40 | 38 |
| 46 | 46 | 45 | 45 | 43 | 42 | 39 | 39 | 37 |

FIG. 21

| CONDITION FORMULA | | | | |
|---|---|---|---|---|
| l2d−e l ≦ I | l2d−f l ≦ I | l2e−g l ≦ I | l2f−g l ≦ I | UNIT AREA TO BE SELECTED |
| × | × | ※ | ※ | D |
| × | ○ | ※ | ※ | F |
| ○ | × | ※ | ※ | E |
| ○ | ○ | × | × | F |
| ○ | ○ | ○ | × | E |
| ○ | ○ | ○ | ○ | G |

| 12 | 12 | 16 | 16 | 16 | 8  | 8  | 8  | 8  |
|----|----|----|----|----|----|----|----|----|
| 16 | 16 | 16 | 32 | 32 | 24 | 16 | 0  | 16 |
| 16 | 16 | 16 | 48 | 40 | 40 | 32 | 32 | 32 |
| 32 | 32 | 48 | 56 | 48 | 42 | 40 | 40 | 40 |
| 48 | 56 | 56 | 56 | 56 | 48 | 48 | 46 | 42 |
| 54 | 54 | 56 | 56 | 56 | 56 | 58 | 46 | 42 |
| 52 | 52 | 50 | 50 | 56 | 48 | 40 | 42 | 42 |
| 50 | 50 | 48 | 48 | 40 | 40 | 40 | 40 | 40 |
| 46 | 46 | 40 | 40 | 43 | 42 | 38 | 39 | 32 |

23-b

| D | D | C | B | C | B | B | C | C |
|---|---|---|---|---|---|---|---|---|
| D | D | C | A | C | C | A | A | A |
| B | B | A | A | C | B | A | A | A |
| C | A | A | C | C | F | C | C | C |
| C | B | B | C | C | C | B | E | E |
| E | E | D | D | C | B | B | E | E |
| E | E | E | E | C | A | C | F | E |
| E | F | C | B | B | B | C | G | C |
| E | E | B | C | G | G | E | G | B |

26-a

| 8 | 8 | 11 | 11 | 11 | 5 | 5 | 5 | 5 |
|---|---|----|----|----|---|---|---|---|
| 11 | 11 | 11 | 12 | 12 | 16 | 11 | 0 | 11 |
| 11 | 11 | 11 | 40 | 28 | 28 | 21 | 21 | 21 |
| 21 | 21 | 40 | 52 | 40 | 31 | 28 | 28 | 28 |
| 40 | 52 | 52 | 52 | 52 | 40 | 40 | 37 | 31 |
| 49 | 49 | 52 | 52 | 52 | 52 | 52 | 37 | 31 |
| 46 | 46 | 43 | 43 | 52 | 40 | 28 | 31 | 31 |
| 43 | 43 | 40 | 40 | 28 | 28 | 28 | 28 | 28 |
| 37 | 37 | 28 | 28 | 32 | 31 | 25 | 26 | 21 |

26-b

| 18 | 18 | 24 | 24 | 24 | 12 | 12 | 12 | 12 |
|----|----|----|----|----|----|----|----|----|
| 24 | 24 | 24 | 43 | 43 | 36 | 24 | 0 | 24 |
| 24 | 24 | 24 | 53 | 48 | 48 | 43 | 43 | 43 |
| 43 | 43 | 53 | 59 | 53 | 49 | 48 | 48 | 48 |
| 53 | 59 | 59 | 59 | 59 | 53 | 53 | 52 | 49 |
| 57 | 57 | 59 | 59 | 59 | 59 | 59 | 52 | 49 |
| 56 | 56 | 56 | 55 | 59 | 53 | 48 | 49 | 49 |
| 55 | 55 | 53 | 53 | 48 | 48 | 48 | 48 | 48 |
| 52 | 52 | 48 | 48 | 50 | 49 | 47 | 47 | 43 |

26-c

| 1 | 0 | 1 | 0 | 1 | 0 | 0 | 0 | 1 |
|---|---|---|---|---|---|---|---|---|
| 0 | 0 | 0 | 0 | 0 | 0 | 0 | 0 | 0 |
| 0 | 0 | 1 | 1 | 1 | 0 | 1 | 0 | 1 |
| 0 | 0 | 0 | 1 | 0 | 1 | 0 | 1 | 0 |
| 1 | 1 | 1 | 1 | 1 | 1 | 1 | 0 | 1 |
| 0 | 1 | 0 | 1 | 1 | 1 | 0 | 1 | 0 |
| 1 | 0 | 1 | 1 | 1 | 0 | 1 | 0 | 1 |
| 0 | 1 | 0 | 1 | 0 | 0 | 0 | 1 | 0 |
| 1 | 1 | 1 | 0 | 1 | 0 | 1 | 0 | 1 |

26-d

| 1 | 0 | 1 | 0 | 1 | 0 | 1 | 0 | 1 |
|---|---|---|---|---|---|---|---|---|
| 0 | 1 | 0 | 1 | 0 | 1 | 0 | 0 | 0 |
| 1 | 0 | 1 | 1 | 1 | 1 | 1 | 1 | 1 |
| 0 | 1 | 1 | 1 | 0 | 1 | 0 | 1 | 0 |
| 1 | 1 | 1 | 1 | 1 | 1 | 1 | 1 | 1 |
| 1 | 1 | 0 | 1 | 1 | 1 | 1 | 1 | 0 |
| 1 | 1 | 1 | 1 | 1 | 1 | 1 | 1 | 1 |
| 0 | 1 | 0 | 1 | 0 | 1 | 0 | 1 | 0 |
| 1 | 1 | 1 | 1 | 1 | 1 | 1 | 1 | 1 |

| 0  | -1 | 0  |
|----|----|----|
| -1 | 5  | -1 |
| 0  | -1 | 0  |

HIGH-PASS
CONVOLUTION
FILTER

28-b

| 1/9 | 1/9 | 1/9 |
|-----|-----|-----|
| 1/9 | 1/9 | 1/9 |
| 1/9 | 1/9 | 1/9 |

LOW-PASS
CONVOLUTION
FILTER

| 20 | 0 | 48 | 48 | 24 | 16 | -72 |
|---|---|---|---|---|---|---|
| 0 | -48 | 96 | 32 | 62 | 32 | 56 |
| 8 | 80 | 80 | 46 | 34 | 38 | 42 |
| 90 | 64 | 56 | 72 | 38 | 50 | 54 |
| 52 | 64 | 62 | 56 | 72 | 90 | 44 |
| 54 | 44 | 40 | 86 | 48 | 14 | 42 |
| 54 | 52 | 62 | 13 | 30 | 42 | 39 |

HIGH-PASS
HALFTONE IMAGE

29-b

| 15 | 21 | 26 | 28 | 24 | 19 | 17 |
|---|---|---|---|---|---|---|
| 23 | 31 | 37 | 40 | 35 | 30 | 28 |
| 36 | 43 | 47 | 48 | 44 | 41 | 39 |
| 48 | 52 | 54 | 53 | 50 | 47 | 44 |
| 53 | 54 | 55 | 54 | 52 | 48 | 45 |
| 52 | 52 | 51 | 50 | 48 | 45 | 43 |
| 48 | 47 | 46 | 45 | 43 | 41 | 39 |

LOW-PASS
HALFTONE IMAGE

29-c

| 0 | 32 | 8 | 40 | 2 | 34 | 10 | 42 |
|---|---|---|---|---|---|---|---|
| 48 | 16 | 56 | 24 | 50 | 18 | 58 | 28 |
| 12 | 44 | 4 | 36 | 14 | 48 | 8 | 38 |
| 60 | 28 | 52 | 20 | 62 | 30 | 54 | 22 |
| 3 | 35 | 11 | 43 | 1 | 33 | 8 | 41 |
| 51 | 19 | 59 | 27 | 49 | 17 | 57 | 25 |
| 15 | 47 | 7 | 38 | 13 | 45 | 5 | 37 |
| 63 | 31 | 55 | 23 | 61 | 31 | 53 | 21 |

DITHER
MATRIX

29-d

| 1 | 0 | 1 | 1 | 1 | 0 | 0 |
|---|---|---|---|---|---|---|
| 0 | 0 | 1 | 1 | 1 | 1 | 0 |
| 0 | 1 | 1 | 1 | 1 | 0 | 1 |
| 1 | 1 | 1 | 1 | 0 | 1 | 0 |
| 1 | 1 | 1 | 1 | 1 | 1 | 1 |
| 1 | 1 | 0 | 1 | 0 | 0 | 0 |
| 1 | 1 | 1 | 0 | 1 | 0 | 1 |

HIGH-PASS
DITHER IMAGE

29-e

| 1 | 0 | 1 | 0 | 1 | 0 | 1 |
|---|---|---|---|---|---|---|
| 0 | 1 | 0 | 1 | 0 | 1 | 0 |
| 1 | 0 | 1 | 1 | 1 | 0 | 1 |
| 0 | 1 | 1 | 1 | 0 | 1 | 0 |
| 1 | 1 | 1 | 1 | 1 | 1 | 1 |
| 1 | 1 | 0 | 1 | 0 | 1 | 0 |
| 1 | 0 | 1 | 1 | 0 | 0 | 1 |

LOW-PASS
DITHER IMAGE

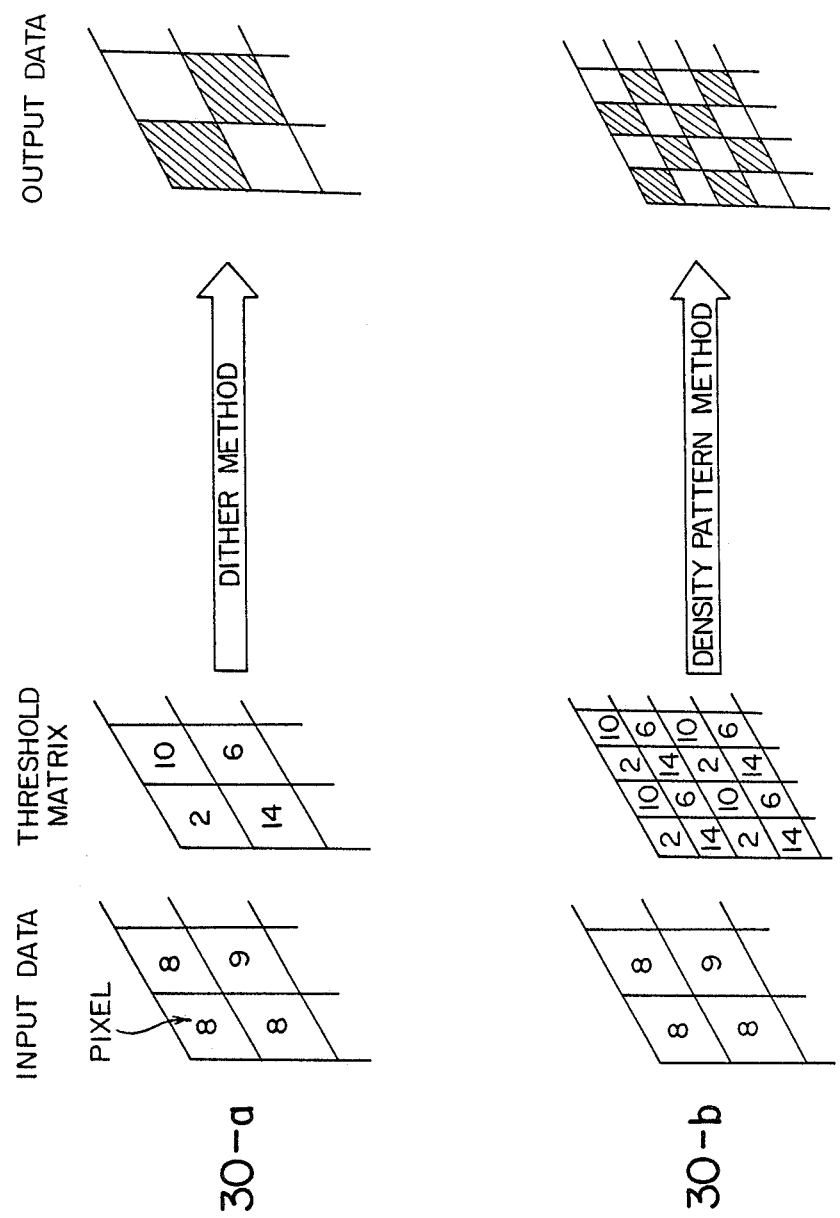

HALFTONE IMAGE ESTIMATION METHODS FOR DITHER IMAGES

BACKGROUND OF THE INVENTION

The present invention relates to image processing methods. More specifically, the present invention relates to an image processing method for dither images.

Most of output apparatuses such as display apparatuses and printing apparatuses in present use display images in only two colors, namely, white and black. A density pattern method (luminance pattern method) and dither pattern method are known as prior arts to express halftones in a pseudo-way using the above described output apparatuses. Both density pattern method and dither pattern method are one type of area gradation methods which vary the number of dots to be recorded in a certain area (matrix).

As shown in FIG. 30-b, the density pattern method records an area corresponding to a pixel in a document with a plurality of dots using a threshold matrix. The dither method records an area corresponding to a pixel in a document with one dot as shown in FIG. 30-a. Dither outputs are obtained according to these two methods as shown in FIGS. 30-a and 30-b. These outputs express halftone images in a pseudo-way with and black dots.

If these binary, pseudo halftone images may be reconverted to original halftone images (corresponding to the input data shown in FIG. 30), the process enables various types of data processing, thus providing a wide range of varieties in image conversion process. In the case of the density pattern method, detection of pattern level arrangement can immediately reconvert a pseudo halftone image to an original halftone image. However the resolution performance is low, in comparison with the input data amount. On the contrary, the resolution performance of the dither method is higher than that of the density method. However it is difficult to reconvert the pseudo halftone images to original halftone images by means of the dither method. Therefore, various image conversions can not be accomplished only by the dither method.

The methods for enlarging or reducing a binary image known in the prior art are as follows:

(1) SPC method

This method selects a pixel on a document located closet to a pixel to be converted and determines the density value of the selected pixel as a value of the pixel to be converted.

(2) Logical sum method

This method outputs Ir, which is a pixel density to be converted, as a logical sum of the densities of Ia, Ib, Ic, and Id of four pixels on a document closest to a pixel to be converted. That is, the Ir is expressed as follows:

$$Ir = Ia \cup Ib \cup Ic \cup Id \qquad (1)$$

(3) 9 division method

This method decides a density Ir of a pixel to be converted using a predetermined logical operation formula, where in a square area on a document whose vertexes are original pixels A, B, C, and D on the document is devided into 9 regions, G1 through G9, and the logical formula equation is determined according to the region Gm (m=1 through 9) including the pixel to be converted. For example, assuming that m=8, Ir is determined by the following formula:

$$Ir = Id \cup Ia \qquad (2)$$

(4) Projective method

This method determines an average density fr of an original pixel which is projected on a pixel to be converted, and then, the fr value is processed with a threshold value to obtain a conversion pixel value Ir.

The process to enlarge or reduce a binary image by the SPC method is simple. However this method has a disadvantage that omissions are likely to occur owing to disconnections in strokes caused by the likelihood that the strokes are narrowed when the binary image is reduced. Although the strokes are made thicker by the logical sum method, this method also has a disadvantage that unnecessary connections of neighboring strokes occur when a binary image is reduced, thus the image is deformed. By making the strokes thicker when a binary image is reduced, the 9 division method ensures a clear image. However, the method is also disadvantageous in that the strokes are also made thicker when the binary image is enlarged, thus the image quality is degraded. Finally, the projection method reduces omissions and deformations in a converted image to a very low level, and the original image is favorably enlarged or reduced with an accurate similarity. However, this method has a drawback that it takes a long period to process the binary image because of the large amount of data to be arithmetically processed.

A reducing or enlarging process of a binary image such as a dither image by means of a prior art causes disadvantageous phenomena such as moire fringe generation, lowering of resolution performance, variation of gradation pattern, and the like. Further, characters are deformed when enlarging a binary image of characters and line drawings, and fine lines are blurred when the image is reduced, thus the quality of converted binary images is greatly degraded.

SUMMARY OF THE INVENTION

In view of the foregoing, it is an object of the present invention to provide an estimation method for halftone dither images, wherein the scale of a digital electronic circuit which can satisfactorily estimate an original halftone image from a dither image is reduced, and the images are quickly processed. It is another object of the present invention to provide a method which can satisfactorily enlarge or reduce binary images including binary images of characters and line drawings which essentially consist of two colors, black and white, or dither images which express halftones in a pseudoway.

The method according to the present invention comprises following steps that, a plurality of scanning unit areas including, at least, a unit area of (1 pixel × 1 pixel) are set in a binary image consisting of white and black regions; a binary image within each scanning unit area is compared, per every scanning unit area, with a binary image obtained from estimated values based on a ratio between white and black regions within said scanning unit area; an estimated value of an optimum scanning unit area is obtained per every pixel of the halftone image to be estimated; a halftone image is produced based on the estimated value; and the estimated halftone image is reconverted to a binary image after processing of enlarging or reducing.

The method according to the present invention may also comprise following steps that a plurality of scanning unit areas are set and shifted, on a dither image obtained with a dither matrix, per every pixel on a halftone image to be estimated;

only one scanning unit area that satisfies a predetermined condition is selected from the plurality of scanning unit areas while shifting the unit area with an increment of a pixel of the dither image; and a halftone image is estimated based on a ratio between white and black regions within said scanning unit area;

wherein a first selection method, which selects only one scanning unit area by comparing, per every scanning unit area, the dither image within each scanning unit area with a binary image converted from a halftone image obtained based on a ratio between white and black regions within the scanning unit area using a dither matrix corresponding to the scanning unit area, and a second selection method, which selects only one scanning unit area by executing a predetermined calculation based on white and black regions within each scanning unit area, are both employed to select only one scanning unit area per every pixel of a halftone image to be estimated.

BRIEF DESCRIPTION OF THE DRAWING

FIGS. 2 (a) through (c) are explanatory drawings showing a case where a dither image is obtained from an orginal halftones image;

FIG. 3 is a view showing a plurality of scanning unit areas:

FIGS. 4 (a) through (e) are views showing examples of obtained estimated halftone images:

FIG. 5 is a view showing selection order of scanning unit areas:

FIGS. 6 through 8 are explanatory drawings showing methods according to the present invetion:

FIG. 9 is a view showing an example of estimated halftone image obtained according to the present invention:

FIG. 10 is a view showing a selected unit area:

FIGS. 12 (a) through (f) are views showing the binary coding processes in enlargement or reduction process:

FIGS. 16 (a) through (g) are views showing examples of obtained estimated halftone images of each unit area:

FIG. 21 is a view explaining a second method:

FIGS. 23 (a) and (b) are views showing each example of a halftone image and unit areas to be selected, obtained according to an embodiment of the present invention:

FIGS. 28 (a) and (b) are views showing characteristics of filters:

FIGS. 29 (a) through (e) are views showing a binary coding process by filtering; and FIGS. 30 (a) and (b) are views showing conventional methods of binary coding process.

DETAILED DESCRIPTION OF THE INVENTION

Referring to the attached drawings, an embodiment of the present invention is further described in detail.

Figure 1:
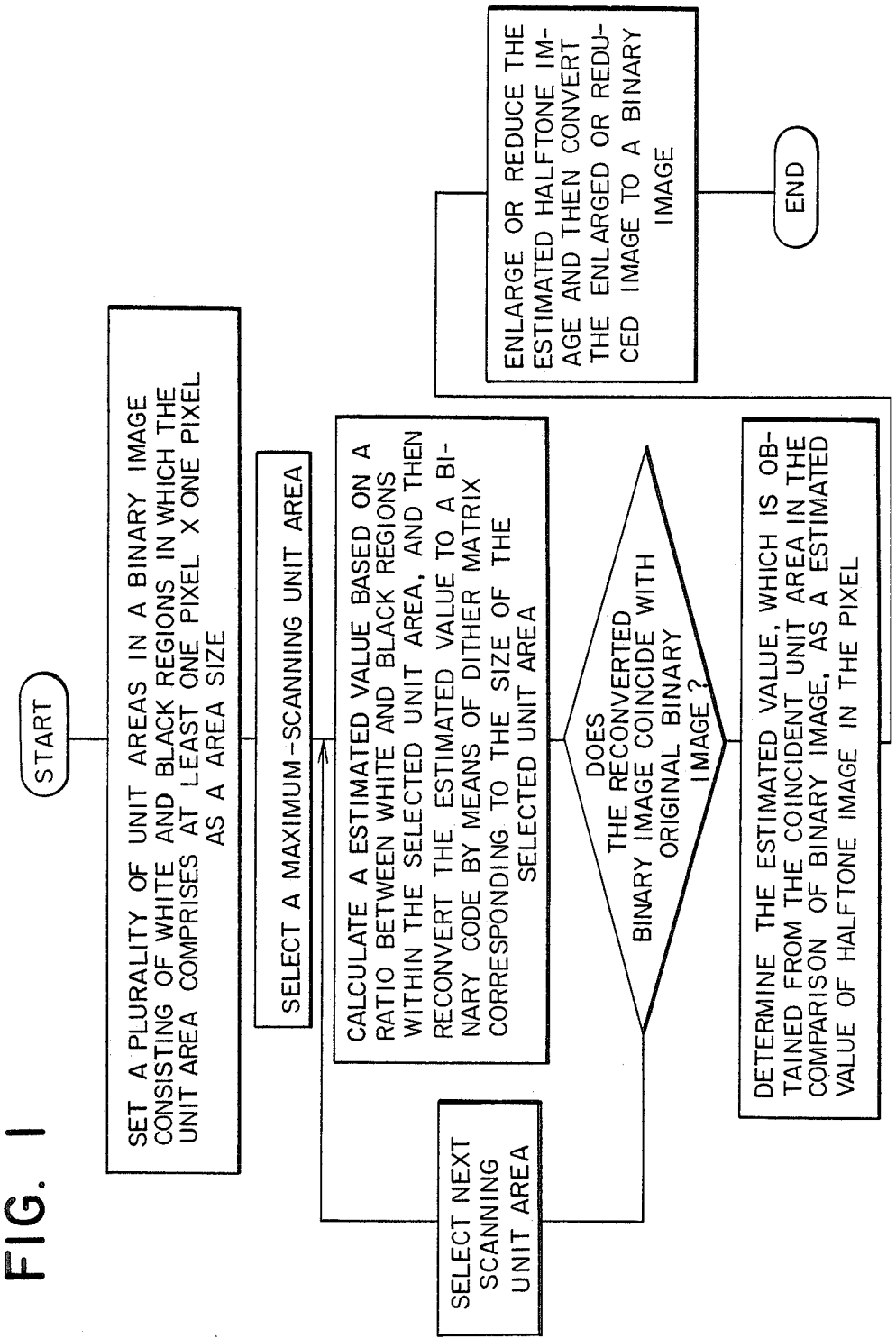
FIG. 1 is a flow chart showing an embodiment of the present invention.

FIG. 1 is a flow chart showing an embodiment of the present invention. The embodiment is further explained referring to the flow chart.

STEP 1

This step sets a plurality of unit areas in a binary image consisting of white and black regions in which the unit areas comprise at least one pixel X one pixel as an area size.

First, an embodiment, which is one of systematic dither methods and employs a Bayer type matrix of $(4 \times 4)$ as a threshold matrix, is explained as an example.

FIGS. 2 (a) through (c) are views showing examples of matrixes describing the present invention. FIG. 2-a shows an original halftone image converted into digital data; FIG. 2-b, a Bayer type dither threshold matrix of $(4 \times 4)$; and FIG. 2-c, a dither image of the original image converted to a monochrome binary image (dither image) using the threshold matrix shown in FIG. 2-b. The Bayer type threshold matrix means a threshold matrix as shown in FIG. 2-b, which produces a dither pattern with dispersing dots.

FIG. 3 shows a plurality of examples of scanning unit areas (unit areas).

Z shows a scanning unit area of (1 row × 1 column);

A, a unit area of (2 rows × 2 columns);

B, a unit area of (2 rows × 4 columns);

C, a unit area of (4 rows × 2 columns); and

D, a unit area of (4 rows × 4 columns), respectively.

As clearly shown in the figure, the scanning area units of (2 rows × 1 column) and (1 row × 2 columns) are not employed in this embodiment, because these unit areas cannot repdoduce a clear image of a gradation document including character images. The black points shown in Z, and A through D are moving centers when the scanning unit area is shifted on the dither image shown in FIG. 2-c. Each row and column correspond to pixels. That is, the (2 rows × 4 columns) scanning unit area corresponds to an area of (2 pixels × 4 pixels). The (1 pixel × 1 pixel) is selected as a scanning unit area in order that a clear image of characters may be reproduced from an original gradation document including characters. In the present invention, the most suitable unit area is selected from a plurality of unit areas. To select the most suitable unit area, the following should be considered:

The gradation determination performance of a human being is high for the regions of low spatial frequencies (regions with less change in pixel density level, and low for the regions of high spatial frequencies (regions with more change in pixel density) level. Therefore, if the low spatial freqeuncy region is expressed with sharp gradation using a large unit area, and the high spatial frequency region is expressed with high resolution using a small unit area, a high quality halftone image can be reproduced as a whole. The estimated halftone images shown in FIGS. 4-a through 4-e are obtained as follows:

Fix the scanning unit area to one of those shown in FIG. 3; shift the unit area on the dither image shown in FIG. 2-c; count the number of white or black pixels (in this figure, white pixels are counted); and assume the count as the estimated value of halftone image.

FIG. 4-a represents a halftone image obtained with the scanning unit area of Z shown in FIG. 3;

FIG. 4-b, a halftone image obtained with the scanning unit area of A shown in FIG. 3;

FIG. 4-c, a halftone image obtained with the scanning unit area of B shown in FIG. 3;

FIG. 4-d, a halftone image obtained with the scanning unit area of C shown in FIG. 3; and FIG. 4-e, a halftone image obtained with the scanning unit area of D shown in FIG. 3.

A further detailed description of this operation is provided below.

STEP 2

This step, first, selects a maximum-scanning unit area D. As described in STEP 1, the basic concept of the present invention is that a unit area as large as possible is selected unless any density change of an original halftone image is found within the unit area. As shown in FIG. 5, the unit area, therefore, is selected in the following order:

$$D \rightarrow C \rightarrow B \rightarrow A \rightarrow Z$$

The method to obtain the halftone image shown in FIG. 4-e is further explained.

The scanning unit area D defined in FIG. 3 is placed on the initial position on a dither image as shown in FIG. 6 so that the moving center coincides with the lower right intersection point of the second row and second column (hereinafter, the point is referred to as (2, 2)). In this case, it is preferable that each pixel included in the unit area is completely covered with the unit area as shown in FIG. 6. That is, it is preferable that an erroneous data is not included in the unit area, such as a lack of a part of one pixel. To facilitate easy understanding, black values are expressed with squares with diagonal lines in this figure. Next, the number of white pixels in the region covered with the unit area is counted, and the counted value is assumed to be an estimated value of halftone image. In this figure, the number of white pixels in the region covered by the scanning unit area is 7. Therefore, the estimated value of a pixel being positioned at the first row and first column (1, 1) of the estimated halftone image is assumed to be 7. Then, by shifting the scanning unit area by one pixel (in this case, one column), 7 is given by counting the number of white pixels in the region covered by the current scanning unit area. The same procedures are repeated by shifting the scanning unit area by each one column until the estimation operation is completed per the row. Then, the scanning unit area is shifted to the next row so that the moving center positions on the lower right intersection point of the third row and the second column (3, 2). These procedures are continued by shifting the scanning unit area until the last row and last column, the estimated values of halftone image are obtained, and then, the halftone image shown in FIG. 4-e is produced.

Next, the method for obtaining the estimated halftone image shown in FIG. 4-c using the scanning unit area B is further explained. In order to allow the moving center of the scanning unit area B to coincide with that of the scanning unit area D, which is the maximum scanning unit area, the starting point of the moving center of the scanning unit area B is as given in FIG. 7. The number of white pixels is 2 in this position. In order to equalize the pixel area covered by the scanning unit area B with that by the scanning unit area D shown in FIG. 3, the number of white pixels should be multiplied by 2. That is, the number of white pixels is:

$$2 \times 2 = 4$$

In this case, the gain of the scanning unit area B is referred to as 2. Likewise, each gain value of the scanning unit areas shown in FIG. 3 is obtained as follows:

$$Z, 16; A, 1; C, 2.$$

The estimated halftone image shown in FIG. 4-c is obtained by executing this calculation every time shifting the scanning unit area B by one pixel. The estimated halftone images shown in FIGS. 4-a, 4-b, 4-d, and 4-e are obtained by the same procedures, therefore these descriptions are omitted.

A halftone image may be estimated in a relatively satisfactory way by the above described method. FIGS. 4-a through 4-e are views showing data of estimated halftone images obtained by the method described above. Since this method estimates the halftone image from the dither image shown in FIG. 2-c, which has information less than the orginal image shown in FIG. 2-a, the method may not reproduce an image completely similar to the orginal image as shown in FIG. 2-a. However, The obtained halftone image is significantly similar values, especially when there is no desity change within the scanning unit area D. Therefore, if the low spatial frequency region is expressed with sharp gradation using a large unit area, and the high spatial frequency region is expressed with high resolution using a small unit area, a halftone image of higher quality than the halftone images shown in FIG. 4a to 4-e can be reproduced as a whole.

STEP 3

In this step, a value is estimated based on a ratio between white and black regions within the selected wnit area, and then, the estimated value is reconverted to a binary code by means of dither matrix corresponding to the size of the selected unit area.

An estimated value of halftone image is obtained in this step, wherein it is assumed that digital binary images have already been stored in a memory means;

a plurality of scanning unit areas are set for the digital binary images, the digital images are processed with predeteremined arithmetical calculation;

the most suitable scanning unit area is selected per each pixel from the plurality of scanning unit areas;

the number of white (or black) pixels within the selected scanning unit area is counted; and the estimated value of halftone image is obtained. As the predetermined arithmetical calculation described above, an algorithm is employed so tha larger and smaller unit areas are selected for a low spatial frequency region (region with less change in pixel density level) and a high spatial frequency region (region with more change in pixel density level), respectively.

The flow is further described referring to FIG. 8. First, the scanning unit area D is selected as explained above. As shown in FIG. 8-a, the scanning unit area D is placed on the predetermined position as shown in FIG. 6, as one example of the initial position of the dither image shown in FIG. 2-c. Counting the number of white pixels within the unit area gives 7. Assuming that the number of white pixels provides the average pixel density level, 7 is given to each pixel within the unit area as shown in FIG. 8-b. The binary image (reconverted binary image) shown in FIG. 8-d is obtained by binary-coding the average pixel density level image shown in FIG. 8-b using the threshold matrix shown in FIG. 8-c.

STEP 4

This step determines whether or not the reconverted binary image coincides with the original binary image.

Referring to FIG. 8, the determination procedure is further described. The reconverted binary image shown in FIG. 8-d is compared with the original binary image shown in FIG. 8-a. As clearly described in the figure, the patterns shown in FIG. 8-a and 8-d do not coincide with each other. This non-coincidence represents these images have different pixel density levels. Therefore, the scanning unit area D is unsuitable to this region. The scanning unit area D is not selected in process (1). Thus, the flow proceeds to STEP 5.

STEP 5

This step selects a next scanning unit area.

The scanning unit area C is selected according to the selection order shown in FIG. 5, and the procedures described in STEPs 3 and 4 are repeated. As shown in FIG. 8-e, the moving center of the scanning unit area C is placed on the initial position shown in FIG. 2-c which is same position with the moving center of the unit area D. Counting the number of white pixels within the scanning unit area provides 4. Assuming that the average pixel density level of 8 is obtained by multiplying 4 by the gain 2, 8 is given to each pixel within the unit area as shown in FIG. 8-f. The reconverted binary image shown in FIG. 8-h is obtained by binary-coding the average pixel density level image shown in FIG. 8-f using the threshold matrix shown in FIG. 8-g (which consists of the second and third columns of the threshold matrix shown in FIG. 2-b and FIG. 8-c, that is, a threshold matrix within the unit area). The reconverted binary image shown in FIG. 8-h is compared with the original binary image shown in FIG. 8-e. As clearly described in the figure, the patterns shown in FIGS. 8-e and 8-h do not coincide with each other. This noncoincidence represents these images have different pixel density levels. Therefore, the scanning unit area C is unsuitable to this region. The scanning unit area C is not selected in process (2). Thus, the flow returns and executes STEPs 3 and 4. Next, the scanning unit area B is selected. As shown in FIG. 8-i, the scanning unit area B is placed on the initial position shown in FIG. 2-c. Counting the number of white pixels within the scanning unit area provides 2. Assuming that the average pixel density level of 4 is obtained by multiplying 2 by the gain 2, 4 is given to each pixel within the unit area as shown in FIG. 8-j. The reconverted binary image shown in FIG. 8-l is obtained by binary-coding the average pixel density level image shown in FIG. 8-j using the threshold matrix shown in FIG. 8-k. The reconverted binary image shown in FIG. 8-l is compared with the original binary image shown in FIG. 8-i. As clearly shown in the figures, these patterns coincide with each other. This coincidence represents that there is no pixel density level change within the scanning unit area. Therefore, the scanning unit area B is suitable to this region. If the coincidence is not obtained, the flow returns and repeats the same procedures until the last scanning unit area (in this case, the scanning unit area Z) is selected. That is, finally the scanning unit area to be selected is the scanning unit area Z.

STEP 6

This step determines the estimated value, which is obtained from the coincident unit area in the comparison of binary images, as an estimated value of halftone image in the pixel.

As described above, when the scanning unit area B is selected, the number of white pixels within the scanning unit area B is 2. Since the gain of the scanning unit area B is 2, the estimated value of the image is $2 \times 2 = 4$. That is, the pixel density level shown in FIG. 8-j is the estimated value of the image. The estimated halftone image shown in FIG. 9 is obtained by executing the above mentioned operation to each pixel in the dither image (binary image) shown in FIG. 2-c. The selected scanning unit areas to obtain the estimated halftone image are as follows:

| pixel in the estimated halftone image | scanning unit area |
|---|---|
| (1, 1) | B |
| (1, 2) | B |
| (1, 3) | B |
| (1, 4) | A |
| (1, 5) | A |
| (1, 6) | B |
| (1, 7) | D |

FIG. 10 is a view showing all selected scanning unit areas for each pixel. Since the estimated halftone image shown in FIG. 9 is obtained by using large scanning unit areas for regions with less change in pixel density level and small scanning unit areas for regions with more change in pixel density level, the estimated halftone image matches with visual sensation of human beings. Therefore, the estimated halftone image is extremely similar to the original halftone image.

STEP 7

This step enlarges or reduces the obtained estimated halftone image, and then, reconverts the enlarged or reduced image to a binary image.

Figure 11:
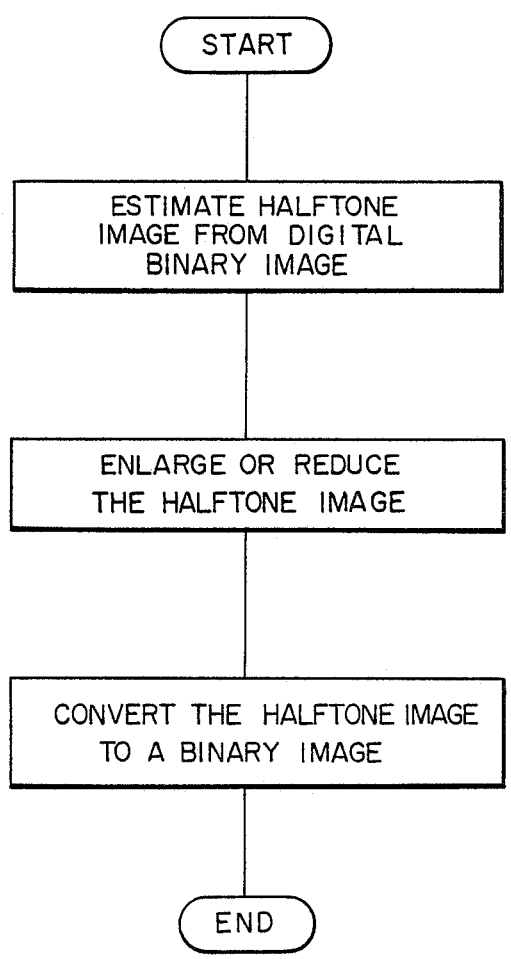
FIG. 11 is a flow chart showing a process of enlargement or reduction of binary images.

FIG. 11 is a flow chart showing the process to enlarge or reduce the estimated halftone image. In the shown process, the halftone image estimated according to the present invention is enlarged or reduced, processed with a threshold matrix, and reconverted to a binary image. For instance, an interpolation method is employed to enlarge or reduce the image.

FIG. 12-a shows an enlarged ($\times 1.25$) halftone image from the halftone image shown in FIG. 9 by the Nearest Neighborhood method. FIG. 12-b shows a reduced ($\times 0.75$) halftone image of the same image. The reconverted binary images (enlarged dither image and reduced dither image) shown in FIGS. 12-e and 12-f are obtained from these halftone images by binary coding these enlarged or reduced images using dither matrixes shown in FIG. 12-c and 12-d, respectively. As these dither images, a dither image obtained by a systematic dither method or a dot dispersion type dither image, wherein threshold values can be dispersed evenly into a dot arrangement, are more preferable than the dither images by the random or conditional dither methods. The Bayer type dither image, wherein the threshold values completely dispersed, is the most preferable.

In the above description, the number of white pixels within a scanning unit area are counted to estimate a halftone image. However, the present invention is not limited to this method. The number of black pixels may be counted in place of white pixels to estimate a halftone image.

In the above description, halftones are obtained by scanning each pixel one by one. However, the present invention is not limited to this method. Two or more pixels may be scanned to obtain halftones. In the above description, four types of scanning unit areas are selected as an example of plurality of scanning unit areas. The present invention, however, is not restricted to this example, and types of unit areas including a unit area of (1 row × 1 column) may be employed. Moreover, the sizes of the unit areas are not restricted to the shown examples, and any sizes of unit areas including a unit area of (1 row × 1 column) may be employed.

As clearly described above, the method according to the present invention employs a plurality of scanning unit areas including, at least, a unit area of (1 pixel × 1 pixel), and selects one scanning unit area for each pixel by a predetermined determination process. The method according to the present invention is constituted so that a binary image is converted to a halftone image, the halftone image is enlarged or reduced, and reconverted to a binary coded image, then an enlarged or reduced binary image is obtained. When the binary image is converted to a halftone image, dither image, which is essentially a halftone image, is estimated to be an image similar to the original image, thereby character or line image may be retained as an original white or black image.

In the above explained embodiment, wherein a plurality of scanning unit areas per each pixel on the halftone image to be estimated are set and moved on the dither image obtained using dither matrix, only one scanning unit area satisfying predetermined conditions is selected from a plurality of scanning unit areas by shifting a scanning unit area with a pixel unit of the dither image, and a halftone image is estimated based on the ratio between white and black regions within the scanning unit area:

the halftone image estimation method may be substituted by both the following first and second methods:

The first selection method selects only one scanning unit area by comparing per each scanning area, the dither image within the scanning unit area with the binary image obtained from a halftone image, which is produced based on the ratio between white and black regions within the scanning unit area, using a dither matrix within the scanning unit area. The second selection method selects only one scanning unit area by executing a predetermined arithmetical calculation based on the white and black regions within the scanning unit area.

Figure 13:
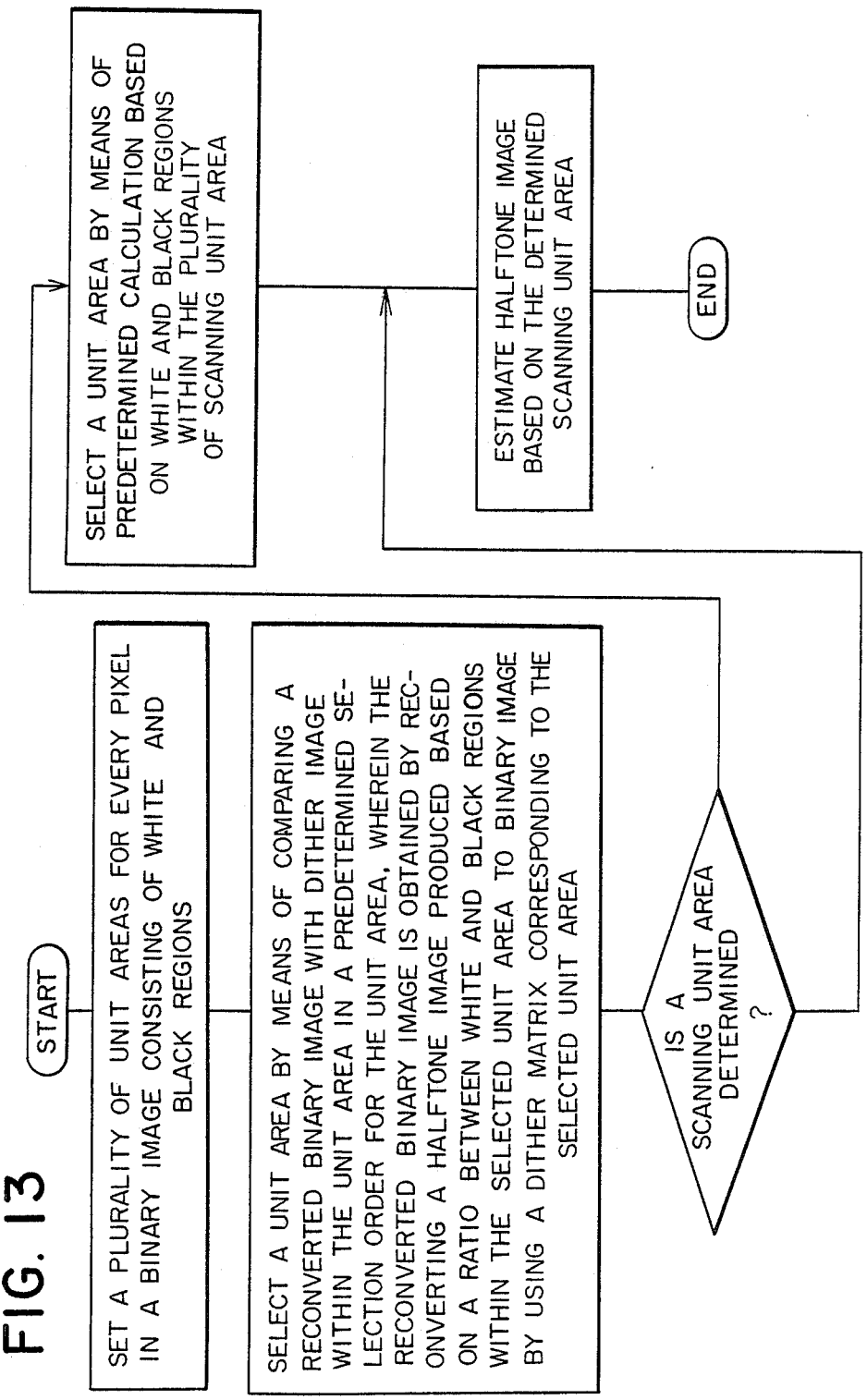
FIG. 13 is a flow chart showing another embodiment of the present invention.

FIG. 13 is a flow chart showing an embodiment of the present invention. One of the systematic dither methods is further explained, wherein a Bayer type matrix of (8 × 8) is employed as a threshold matrix.

STEP 1

This step sets a plurality of unit areas for every pixel in a dither image consisting of white and black regions.

Figure 14:
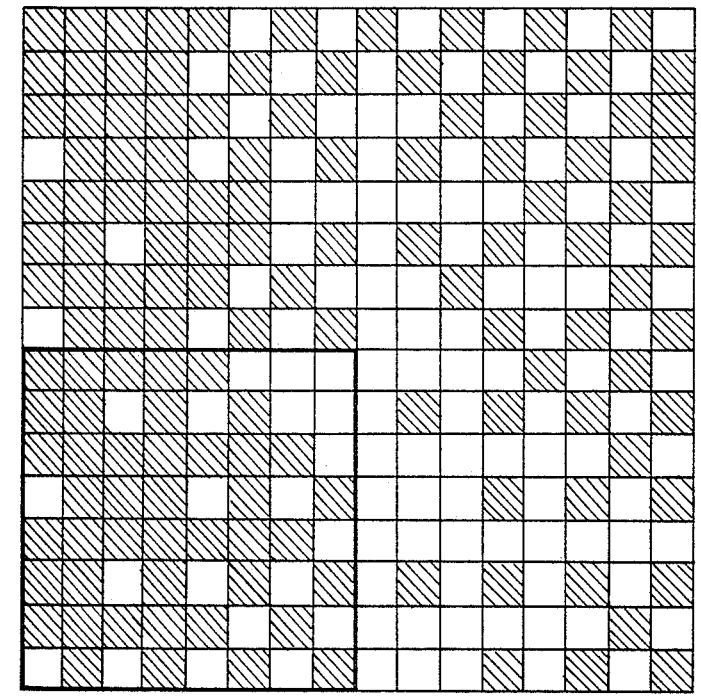
FIGS. 14 (a) through (c) are explanatory drawings showing a case where a dither image is obtained from an original halftone image.

FIGS. 14-a through 14-c are views showing examples of matrix to explain the present invention.

FIG. 14-a shows an original halftone image converted to digital data;

FIG. 14-b a Bayer type dither threshold matrix of (8 × 8); and

FIG. 14-c, a dither image (monochrome binary image) of the original image shown in FIG. 14-a converted using the threshold matrix shown in FIG. 14-b. The Bayer type threshold matrix means a matrix which produces a dither pattern with dispersing dots shown in FIG. 14-b.

Figure 15:
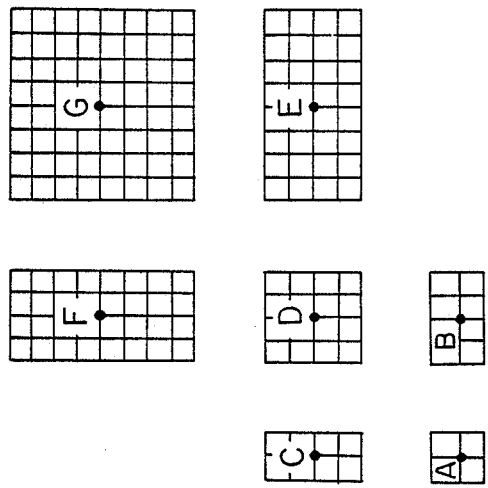
FIG. 15 is a view showing a plurality of scanning unit areas.

FIG. 15 shows examples of a plurality of scanning unit areas employed in the present invention. In this figure, A represents a unit area of (2 rows × 2 columns);

B, a unit area of (2 rows × 4 columns);

C, a unit area of (4 rows × 2 columns);

D, a unit area of (4 rows × 4 columns);

E. a unit area of (4 rows × 8 columns);

F, a unit area of (8 rows × 4 columns); and

G, a unit area of (8 rows × 8 columns).

The black points shown in the unit areas of A through G are moving centers when shifting the unit area on the dither image shown in FIG. 14-c.

The estimated halftone images shown in FIGS. 16-a through 16-g are obtained as follows:

Fix the scanning unit area to one of those shown in FIG. 15; shift the unit area on the dither image shown in FIG. 14-c; count the number of white or black pixels (in this figure, white pixels are counted); and assume the count as the estimated value of halftone image.

FIG. 16-a represents a halftone image obtained with the scanning unit area of A shown in FIG. 15;

FIG. 16-b, a halftone image obtained with the scanning unit area of B shown in FIG. 15;

FIG. 16-c, a halftone image obtianed with the scanning unit area of C shown in FIG. 15;

FIG. 16-d, a halftone image obtained with the scanning unit area of D shown in FIG. 15;

FIG. 16-e, a halftone image obtained with the scanning unit area of E shown in FIG. 15;

FIG. 16-f, a halftone image obtained with the scanning unit area of F shown in FIG. 15; and FIG. 16-g, a halftone image obtained with the scanning unit area of G shown in FIG. 15.

Figure 17:
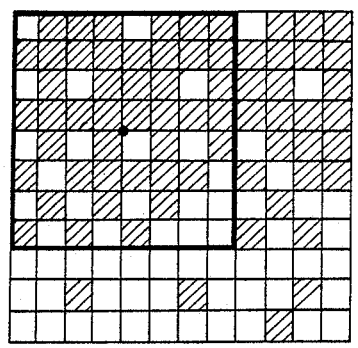
FIGS. 17 and 18 are views describing an estimation of a halftone image.

First, the method to obtain the halftone image shown in FIG. 16-g is further explained;

The scanning unit area G defined in FIG. 15 is now placed on the initial position on a dither image as shown in FIG. 17 so that the moving center coincides with the lower right intersection point of the fourth row and fourth column (the point is referred to (4, 4) as same with the aforementioned manner). The dither image shown in FIG. 17 is a part of the dither image shown in FIG. 14-c. In this case, it is preferable that each pixel included in the unit area is completely covered with the unit area as shown in FIG. 17. To facilitate easy understanding, black values are expressed with squares with diagonal lines in this figure. Next, the number of white pixels in the region covered with the unit area G is counted, and the counted value is assumed to be an estimated value of halftone image. In this figure, the number of white pixels in the region covered by the scanning unit area G is 21. Therefore, the estimated value of the first row and first column (1, 1) of the estimated halftone image is assumed to be 21. Then, by shifting the scanning unit area G by one pixel (in this case, one column), 20 is given by counting the number of white pixels in the region covered by the current scanning unit area G. The same procedures are repeated by shifting the scanning unit area by each one column until the estimation operation is completed per the row. Then, the scanning unit area 0 is shifted to the next row so that the moving center positions on the lower right intersection point of the fifth row and the fourth column (5, 4). These procedures are continued by shifting the scanning unit area until the last row and last column, the estimated values of halftone image are obtained, and then, the halftone image shown in FIG. 16-g is produced.

Figure 18:
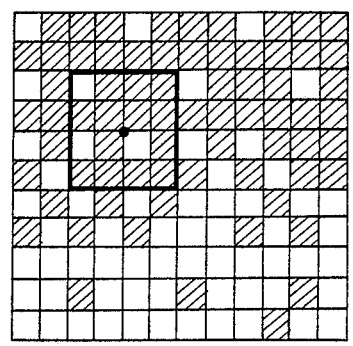

Next, the method for obtaining the estimated halftone image shown in FIG. 16-d using the scanning unit area D is further explained. In order to allow the moving center of the scanning unit area D to coincide with that of the scanning unit area G, which is the maximum scanning unit area, the starting point of the moving center of the scanning unit area D is as given in FIG. 18. The number of white pixels is 3 in this position. In order to equalize the pixel area covered by the scanning unit area D with that by the scanning unit area G shown in FIG. 15, the number of white pixels should be multiplied by 4. That is, the number of white pixels is;

$$3 \times 4 = 12$$

In this case, the gain of the scanning unit area D is referred to as 4. Likewise, each gain value of the scanning unit areas shown in FIG. 15 is obtained as follows:

A, 16; B, 8; C, 2; E, 2; F, 2; and G, 1

The estimated halftone image shown in FIG. 16-d is obtained by executing this calculation every time shifting the scanning unit area D by one pixel. The estimated halftone images shown in FIGS. 16-a, through 16-c, 16-e, and 16-f are obtained by the same procedures, therefore these descriptions are omitted.

A halftone image may be estimated in a relatively satisfactory way by the above described method. FIGS. 16-a through 16-g are views showing data of estimated halftone images obtained by the method described above. Since this method estimates the halftone image from the dither images shown in FIG. 14-c, which has information less than the original image shown in FIG. 14-a, the method may not reproduce an image completely similar to the original image as shown in FIG. 16. However, the obtained halftone image is significantly similar to the original image except portions where pixel density level abruptly changes. The estimated values of halftone images completely coincide with the original halftone image values, especially when there is no pixel density level change within the scanning unit area G.

STEP 2

This step selects a unit area by means of comparing a reconverted binary image with the dither image within the unit area in a predetermined selection order for the unit area, wherein the reconverted binary image is obtained by reconverting a halftone image produced based on a ratio between white and black regions within the selected unit area to binary image by using a dither matrix corresponding to the selected unit area.

The method according to the present invention is further explained. An estimated value of halftone image is obtained by the method, wherein it is assumed that digital binary images have already stored in a memory means;

a plurality of scanning unit areas are set for the digital binary image, the digital images are processed with a predetermined arithmetical calculation;

the most suitable scanning unit area is selected per each pixel from the plurality of scanning unit areas; the number of white (or black) pixels within the selected scanning unit area is counted; and the estimated value of halftone image is obtained.

Figure 19:
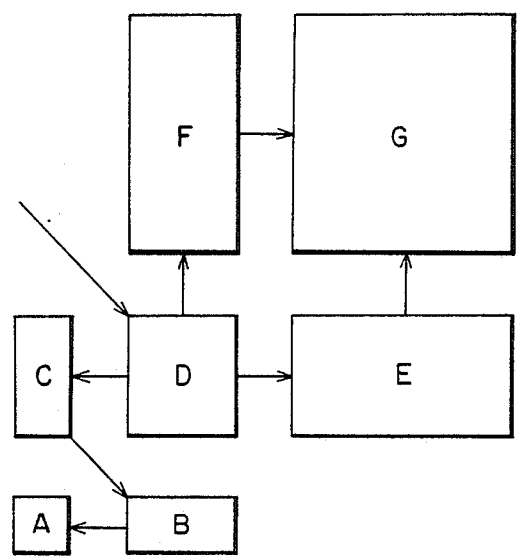
FIG. 19 is a view showing selection order of scanning unit areas.

As the predetermined arithmetical calculation described above, an algorithm is employed so that larger and smaller unit areas are selected for a low spatial frequency region (region with less change in pixel density level) and a high spatial frequency region (region with more change in pixel density level), respectively. The basic concept of the present invention is that a scanning unit area of as large as possible is selected unless any density change of an original halftone image is found within the unit area. FIG. 19 shows a selection order of scanning unit areas according to the present invention. Assuming the scanning unit area D as a reference unit area, the first method described below selects the most suitable unit area using a unit area in the following order:

D→C→B→A

If the most suitable unit area cannot be selected by the first method, the second method searches the most suitable unit area in the order of D→E→G or D→F→G.

PROCESS (1)

Figure 20:
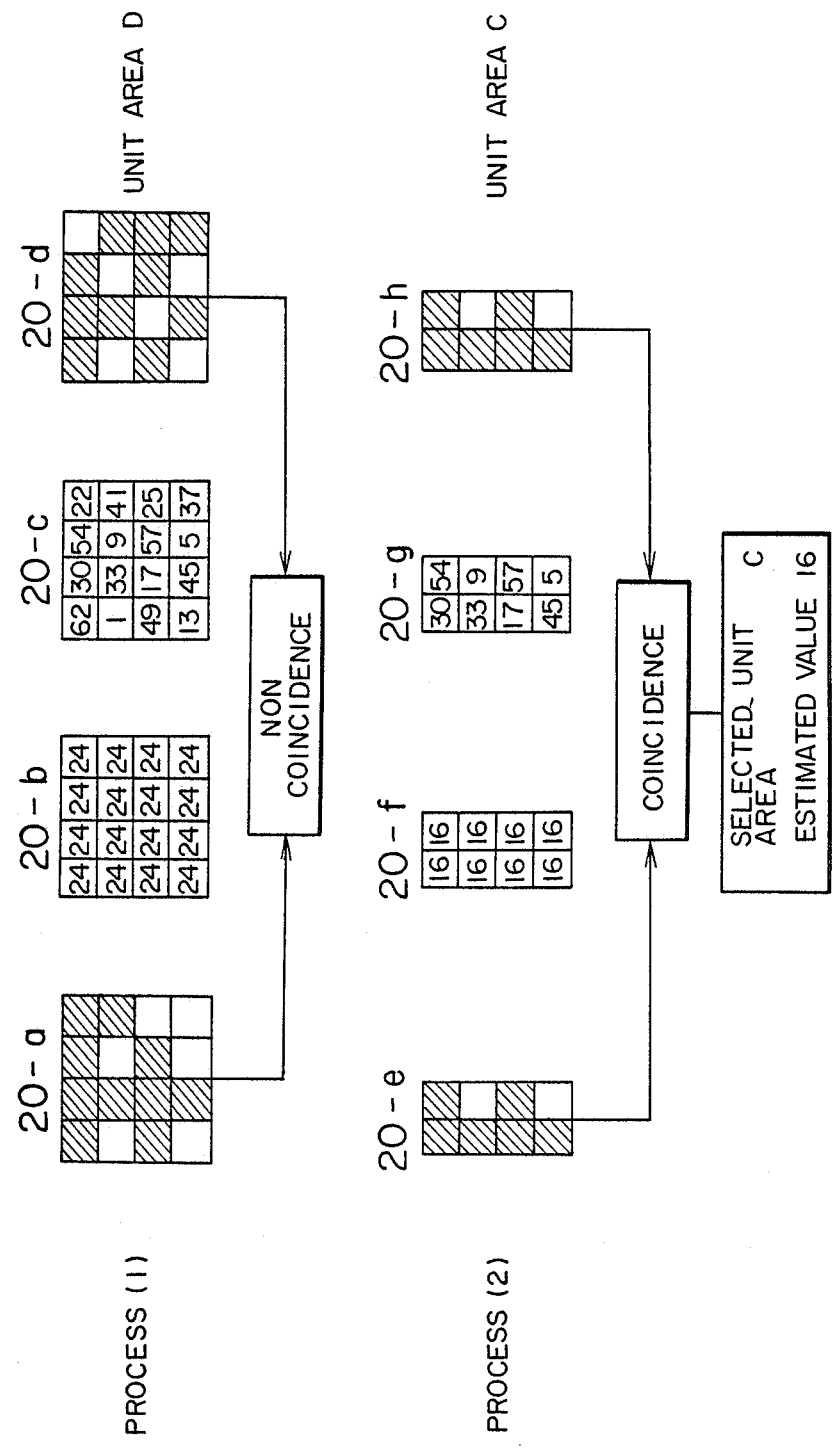
FIG. 20 is a view explaining a first method.

The scanning unit area D is examined, first. As shown in FIG. 20-a, the moving center of the unit area D is placed on the position (5, 8) in FIG. 14-c (this position corresponds to the pixel (2, 3) of the estiamted halftone image as shown in FIG. 16-d) Counting the number of white pixels within the unit area gives 6. Assuming that the average pixel density level is 24 obtained by multiplying the number of white pixels of 6 by the gain of 4, 24 is given to each pixel within the unit area as shown in FIG. 20-b. The dither image shown in FIG. 20-d is obtained by binary coding the average pixel level image shown in FIG. 20-b using the threshold matrix shown in FIG. 20-c. The reconverted binary image shown in FIG. 20-d is compared with the original dither image shown in FIG. 20-a, and it is determined that these patterns do not coincide with each other. This non-coincidence represents there are pixel density level change in the original halftone image within the unit area D. Therefore, the unit area D is unsuitable to this region. The scanning unit area D is not selected in process (1). Thus, the flow proceeds to PROCESS (2). If the patterns shown in FIGS. 20-a and 20-d coincide with each other, this coincidence represents that the pixel density level change can not be detected by the scanning unit area D. Therefore, a unit area not smaller than the unit area D is required, and the flow advances to STEP 4.

PROCESS (2)

The unit area C is selected in this process. As shown in FIG. 20-e the moving center of the unit area C is placed on the position (5, 6) in FIG. 14-c which is same position with the moving center of the unit area D. Counting the number of white pixels within the unit area gives 2. Assuming that the average pixel level is 16 obtained by multiplying the number of white pixels of 2 by the gain of 8, 16 is given to each pixel within the unit area as shown in FIG. 20-f. The dither image shown in FIG. 20-h is obtained by binary coding the average pixel level image shown in FIG. 20-f using the threshold matrix shown in FIG. 20-g, which consists of the second and third columns of the threshold matrix shown in FIG. 20-c. The reconverted binary image shown in FIG. 20-h is compared with the original dither image shown in FIG. 20-e, and it is determined that these patterns coincide with each other. This coincidence represents there is no pixel density level change in the original halftone image within the unit area C. Therefore, the unit area C is suitable to the region. If these patterns do not coincide, the flow proceeds to PROCESS (3), wherein the next unit area B is examined.

PROCESS (3)

In this process the same procedures in PROCESSes (1) and (2) are executed. However this example does not require this process. By the way, if the coincidence between both patterns is not still obtained in PROCESS (3), then next unit area A is examined. Even when the coincidence is not still attained by using the minimum unit area A, the minimum unit areaA is selected as the suitable unit area.

Thus, when the scanning unit area C is selected in this example, the number of white pixels within the selected unit area C is 2. As the gain of the unit area C is 8, the estimated value of the image is $2 \times 8 = 16$ as shown in FIG. 20-f.

STEP 3

This step detects whether or not a scanning unit area is determined in STEP 2.

As described in PROCESS (1) of STEP 2, it is determined that there is no pixel density level deviation when the reconverted binary image shown in FIG. 20-d coincides with the original binary image shown in FIG. 20-a. At this point, the scanning unit area selection is completed because the gradation lowers if another unit area smaller than the current unit area is selected. Therefore, the first method explained in STEP 2 cannot be used in this case, and the second method should be employed.

STEP 4

This step selects only one unit area by means of a predetermined calculation based on white and black regions within a plurality of scanning unit areas.

Figures 25, 26:
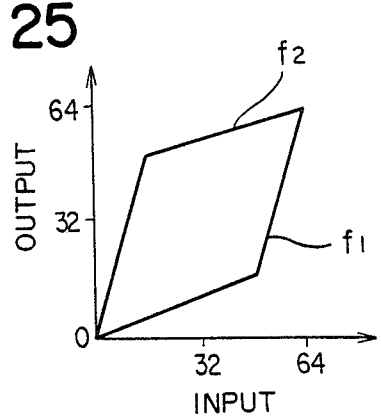
FIG. 25 is a graph showing characteristics of gradation conversion.
FIGS. 26 (a) through (d) are views showing the binary coding process by gradation conversion.

The unit areas D through G shown in FIG. 25 are used. Assuming that the number of white pixels within each unit area is d through g, respectively, the conditions that represent no pixel density level change are defined as follows:

$$|2d - e| \leqq 1 \quad (11)$$

$$|2d - f| \leqq 1 \quad (12)$$

$$|2e - g| \leqq 1 \quad (13)$$

$$|2f - g| \leqq 1 \quad (14)$$

When each condition formula is satisfied, a mark 0 is given; if each condition formula is not satisfied, a mark X is given. The unit area to be selected should be as given in FIG. 21. In this figure, the * mark represents 0 or X mark. For example, if the condition formulas (11) and (12) are not satisfied, the unit area D is selected without determining whether or not the formulas (13) and (14) are satisfied. If the formula (11) is satisfied, but not the formula (12), the unit area E is selected. If the formula (12) is satisfied, but not the formula (11), the unit area F is selected. If the formulas (11) through (14) are satisfied, the unit area G is selected. In the above mentioned condition, an optimum unit area is selected assuming that each moving center of the unit areas D through G is placed on, for example as a scanning unit area is not determined in step 2, the right lower intersection point of the (4, 4) pixel in the dither image shown in FIG. 14-c. In this case, the followings are obtained:

Where $d = 3$, $e = 9$, $f = 8$, $g = 21$

First, the formulas (11) and (12) are calculated;

$|2d - e| = |6 - 9| = 3$; the formula (11) is not satisfied, $|2d - f| = |6 - 8| = 2$; the formula (12) is not satisfied, Therefore, the optimum unit area is D according to FIG. 21. Next, an estimated value of the first row and first column pixel in the halftone image is obtained when the unit area D is selected. The number (d) of white pixels is 3 when the moving center of the unit area D is placed on the position (4, 4) in this example, and the gain of the unit area D is 4. Therefore, the estimated value of halftone image is $3 \times 4 = 12$.

Figure 22:
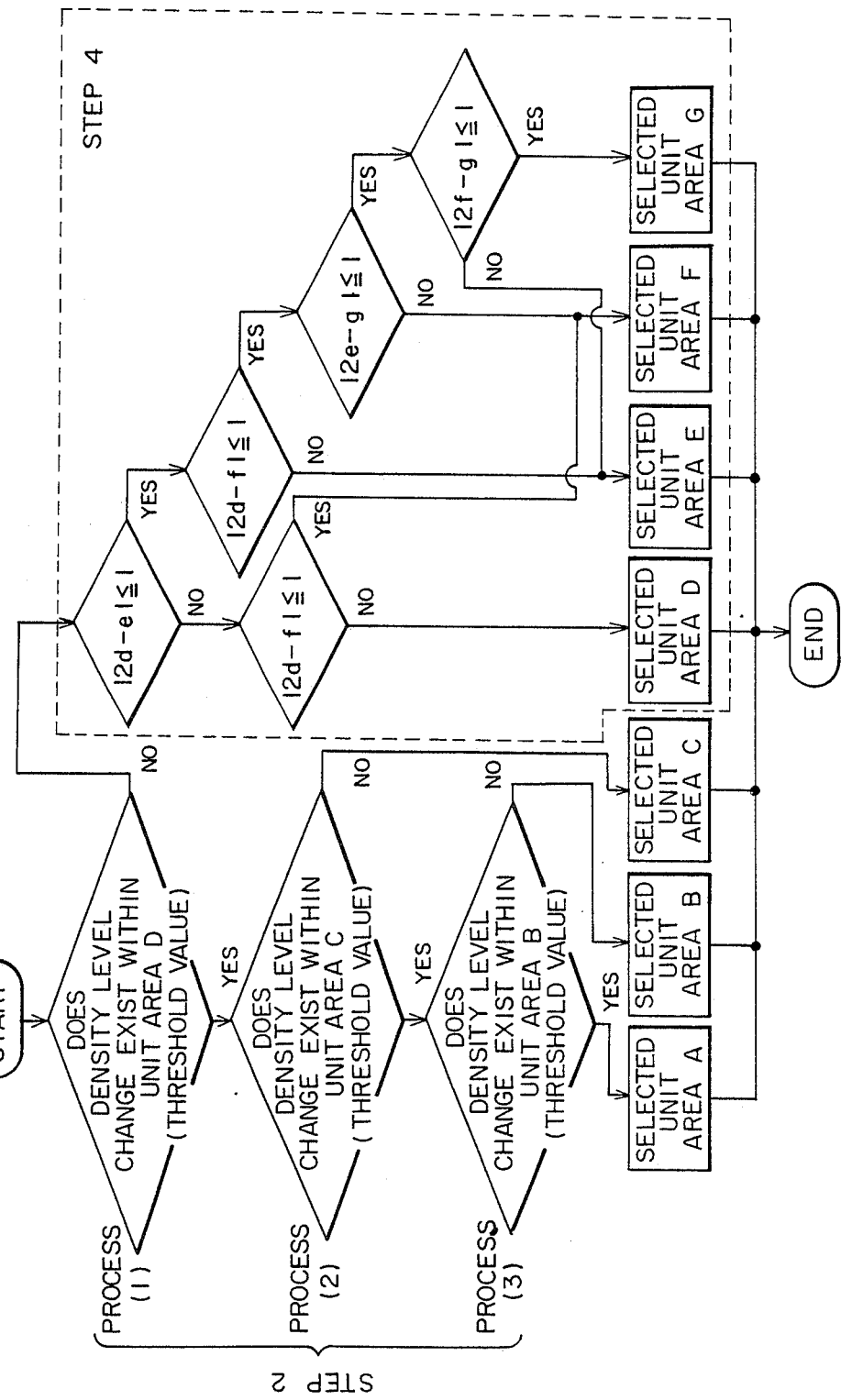
FIG. 22 is a flow chart showing procedure for selecting scanning unit areas.

An optimum scanning unit area is selected per every pixel by the above described procedure. FIG. 22 is a flow chart showing procedure for selecting scanning unit area, summarizing the above description.

STEP 5

This step estimates a halftone image based on the selected scanning unit area.

An optimum scanning unit area is always selected per each pixel by the first or second method described above. Therefore, a halftone image can be estiamted based on the ratio between white and black regions within the selected unit area. For instance, the number of white pixels within the scanning unit area may be assumed to be the estimated value.

FIG. 23 shows the estimated halftone image obtained from the binary image shown in FIG. 14-c. The selected scanning unit areas to obtain the estimated halftone image are as follows:

| Pixel in the estimated halftone image | Scanning unit area |
| --- | --- |
| (1, 1) | D |
| (1, 2) | D |
| (1, 3) | C |
| (1, 4) | B |
| (1, 5) | C |
| (1, 6) | B |
| (1, 7) | B |
| (1, 8) | C |
| (1, 9) | C |

FIG. 23-b is a view showing all selected scanning unit areas for each pixel. Since the estimated halftone image shown in FIG. 23-a is obtained by using large scanning unit areas for regions with less change is pixel density level and small scanning unit areas for regions with more pixel density level change, the estiamted halftone image matches with visual sensation of human beings. Therefore, the estimated halftone image is extremely similar to the original halftone image shown in FIG. 14-a.

In the embodiment shown in FIG. 11, a method is described, wherein an estimated halftone image obtained from a dither image is enlarged or reduced, and the enlarged or reduced image is reconverted to a binary image. As same to the enlarging or reducing operation, a newly converted binary image can be obtaind by performing gradation converting or filtering the estimated halftone image.

Figure 24:
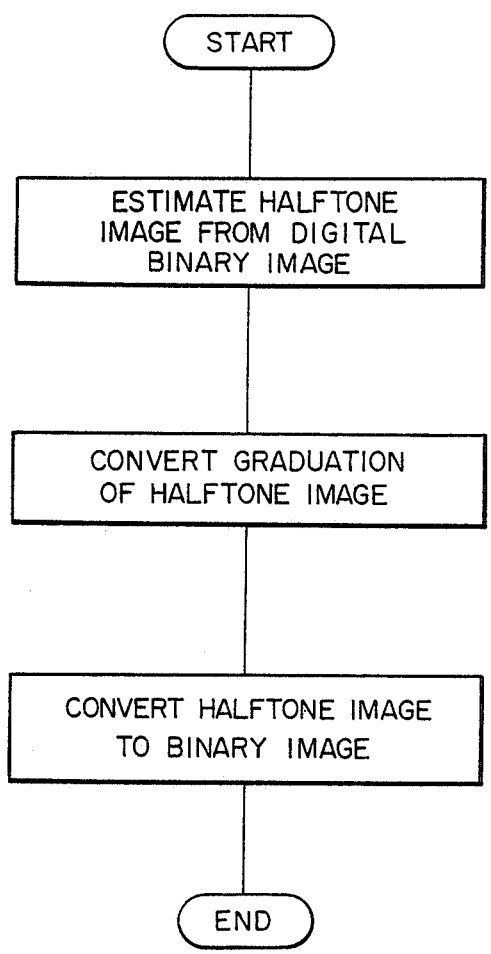
FIG. 24 is a flow chart showing a process of gradation conversion.

FIG. 24 is a flow chart showing a process to convert the gradation of an estimated halftone image. The process shown in the figure converts gradation of an estiamted halftone image obtained according to the present invention, and obtains, from the converted image, a newly converted binary image using a threshold matrix. The characteristics of gradation conversion may be as given in FIG. 25. In this figure, f1 and f2 represent gradation conversion characteristic curves; the abscissa axis, input; the ordinate axis, output; and numerals, pixel density levels.

FIG. 26-a shows a halftone image whose gradation is converted from the image shown in FIG. 23-a using the f1 curve shown in FIG. 25; FIG. 26-b, a halftone image whose gradation is converted using the f2 curve shown in FIG. 25; FIG. 26-c, a binary image of the image shown in FIG. 26-a binary-coded using a Bayer type dither matrix of (8×8) described above; FIG. 26-d, a binary coded image of the image shown in FIG. 26-b. In FIGS. 26-c and 26-d, "1" and "0" correspond to white and black pixels, respectively. As clearly shown in these figures, the binary images greatly differ from each other according to the used gradation conversion characteristics.

Figure 27:
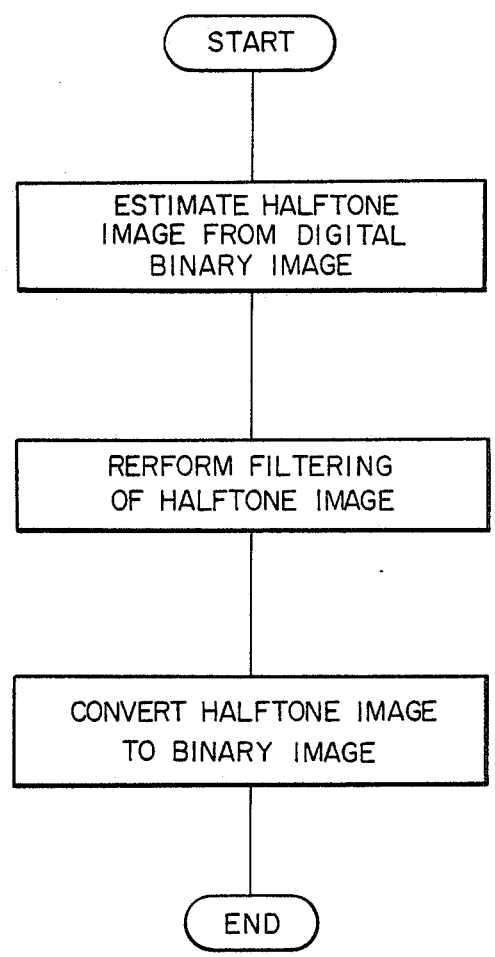
FIG. 27 is a flow chart showing a filtering process.

FIG. 27 is a flow chart showing a process to perform filtering to an estimated halftone image. The process shown in the figure performs filtering to an estimated halftone image obtained according to the present invention, and obtains, from the filtered halftone image, a newly converted binary image using a threshold matrix. The characteristics of filters may be as given in FIG. 28. FIG. 28-a shows a highpass convolution filter; FIG. 28-b, a low-pass convolution filter. When the estiamted halftone image shown in FIG. 23-a is filtered with the high- and low-pass convolution filters shown in FIGS. 28-a and 28-b, the high- and low-pass halftone images shown in FIGS. 29-a and 29-b are obtained. By converting these halftone images to binary images with the dither matrix shown in FIG. 29-c, high and low-pass dither images shown in FIGS. 29-d and 29-e are obtained, respectively. In these figures "1" and "0" correspond to white and black pixels, respectively. As these dither images, a dither image obtained by a systematic dither method or a dot dispersion type dither image, wherein threshold values can be dispersed evenly into a dot arrangement, are more preferable than the dither images by the random or conditional dither methods. The Bayer type dither image, wherein the threshold values completely dispersed, is the most preferable.

In the above description, the number of white pixels within a scanning unit area are counted to estimate a halftone image. However, the present invention is not limited to this method. The number of black pixels may be counted to estimate a halftone image.

In the above description, halftones are obtained by scanning each pixel one by one. However, the present invention is not limited to this method. Two or more pixels may be scanned to obtain halftones. In the above description, four types of scanning unit areas are selected as an example of plurality of scanning unit areas. The present invention, however, is not restricted to this example, any type of unit areas may be employed. Moreover, the sizes of the unit areas are not restricted to the shown examples, and any sizes of unit areas may be employed.

As clearly described in the foregoing, the present invention provides a method to obtain an image similar to an original image, whereby a plurality of scanning unit areas are set; a dither image is scanned with a unit area while selecting an optimum unit area per every pixel by means of a predetermined calculation; a number of white pixels within the selected unit area is counted; and the counted value is assumed to be the estimated value of the halftone image. A document consisting of line images and gradation images may be clearly reproduced by the method according to the present invention. Since the visual sensation of human beings is taken into consideraton, the obtained estimated value of halftone image is more similar to the original image. The present invention provides various methods for processing such as gradation conversion, enlargement, and reduction after obtaining the halftone image.

What is claimed is:

1. A method of estimating a halftone image from an original binary image formed of an array of a plurality of pixels, each of said pixels having one of two different components characteristic of a binary image, comprising the steps of:

(a) selecting a group of differently configured scanning area units ("SAU's"), each of said SAU's being adapted to enclose a portion of the original binary image having a predetermined number of pixels of said array to be represented with a halftone level;

(b) selecting a first target pixel from among the array of a plurality of pixels;

(c) choosing one of said group of SAU's;

(d) setting said chosen SAU onto a portion of the original binary image which includes said first target pixel;

(e) obtaining a counted value of the number of pixels in the portion of the original binary image enclosed within said chosen SAU which have the same one of the two characteristic components of a binary image;

(f) assigning a halftone level related to said counted value to each of the pixels in the portion of the original binary image enclosed within the chosen SAU;

(g) converting the assigned halftone level into a converted binary image with a threshold value matrix, said threshold vlaue matrix having a plurality of threshold values corresponding in number to the predetermined number of pixels in the portion of the original binary image enclosed within the chosen SAU;

(h) comparing an image pattern of the converted binary image with that of the portion of the original binary image enclosed by said chosen SAU to obtain a comparison result;

(i) determining whether the comparison result satisfies a predetermined condition and, if it does, to provide an identified SAU for the first target pixel;

(j) if the comparison result does not satisfy the predetermined condition of step (i) for the chosen SAU, repeating steps (c)–(i) for other SAU's in said group of SAU's chosen in sequence until an identified SAU is found;

(k) generating an estimated halftone image for the first target pixel related to the assigned halftone level obtained with the identified SAU in step (f);

(l) sequencing to a next target pixel in the array of a plurality of pixels; and (m) repeating steps (c)-(k) for the next target pixel.

2. The method of claim 1, wherein said plural unit areas do not include two kinds of unit areas represented by (two pixels×one pixel) and (one pixel×two pixels) in area size of (row×column).

3. The method of claim 1, wherein said method further comprises a step of processing the reproduced halftone image by enlarging or reducing, and then converting the enlarged or reduced halftone image into a binary image data.

4. The method of claim 1, wherein each of said group of SAU's comprises an area of at least one pixel.

5. The method of claim 1, wherein the two components characteristic of a binary image are white and black, and wherein step (e) comprises superimposing the chosen SAU on said original binary image, determining the number of white pixels therein, and basing the estimated halftone value on the determined number of white pixels.

6. The method of claim 1, wherein said threshold value matrix is a dither matrix.

7. The method of claim 6, wherein said original binary image is obtained by coding an original halftone image with said dither matrix.

8. The method of claim 7, wherein said dither matrix is Bayer type dither matrix.

9. A method of estimating a halftone image from an original binary image formed of an array of a plurlaity of pixels, each of said pixels having one of two different components characteristic of a binary image, comprising the steps of:

(1) selecting a plurlaity of differently configured scanning area units ("SAU's") classified into at least two groups, each of said SAU's being adapted to enclose a portion of the original binary image having a predetermined number of pixels of said array to be represented with a halftone level;

(2) selecting a first target pixel from among the array of a plurality of pixels;

(3) selecting an optimum SAU for said first tartet pixel from said plurality of SAU's in accordance with a predetermined procedure, said procedure comprising:

a first selection process including the steps of
(a) choosing one SAU in a first group of said at least two groups of SAU's,
(b) setting said chosen SAU onto a portion of the original binary image which includes said ifrst target pixel,
(c) obtaining a counted value of the number of pixels in the portion of the original binary image enclosed within said chosen SAU which have the same one of the two characteristic components of a binary image;
(d) assigning a halftone level related to said counted value to each of the pixels in the portion of the original binary image enclosed within the chosen SAU;
(e) converting the assigned halftone level into a converted binary image with a threshold value matrix, said threshold value matrix having a plurality of threshold values corresponding in number to the predetermined number of pixels in the portion of the original binary image enclosed within the chosen SAU;
(f) comparing an image pattern of the converted binary image with that of the portion of said original binary image enclosed within said chosen SAU to obtain a comparison result,
(g) determining whether the comparison result satisfies a first predetermined condition and, if it does, to provide an identified SAU for the first target pixel,
(h) if the comparison result does not satisfy the predetermined condition of step (g) for the chosen SAU, repeating steps (a)-(g) for other SAU's in said first group of SAU's until an identified SAU is found, and
(i) determining a first optimum SAU to be the identified SAU, and a second selection process including the steps of
(j) setting at least one of the SAU's of another group of the at least two groups of SAU's onto said portion of the orginial binary image which includes the first target pixel,
(k) obtaining a counted value of the number of pixels in the portion of the original binary image enclosed within said at least one of the other group of SAU's having the same one of the two characteristic components of a binary image,
(l) performing a predetermined calculation on the basis of the respective counted values of said other group of SAU's to obtain a calculation result, and
(m) determining a second optimum SAU on the basis of the first optimum SAU and the calculation result;

(4) generating an estimated halftone image for the first target pixel relatied tot he counted value obtained with the second optimum SAU;

(5) sequencing to a next target pixel; and (6) repeating stpes (3) and (4).

10. The method of claim 9, wherein said plural unit areas are divided into two groups of which the first group unit areas consists of relatively smaller unit areas in size than those of the second group unit areas, and wherein said first selection way is applied for the first group unit areas and said second selection way is applied for the second group unit areas.

11. The method of claim 10, wherein said predetermined order firstly carry out said first selection way and then the second selection way.

12. The method of claim 11, wherein said predetermined order firstly carry out said first selection way, and then according to the result of the first selection way said predetermined order can judge whether or not carrying out the second selection way.

13. The method of claim 9, wherein said threshold value matrix is a dither matrix.

14. The method of claim 13, wherein said original binary image is obtained by coding an original halftone image with said dither matrix.

15. The method of claim 14, wherein said dither matrix is Bayer type dither matrix.

16. The method of claim 9, wherein each of said plurality of SAU's comprises an area of at least one pixel.

* * * * *